United States Patent
Martin et al.

(10) Patent No.: US 8,364,858 B1
(45) Date of Patent: Jan. 29, 2013

(54) NORMALIZING CAPACITY UTILIZATION WITHIN VIRTUAL STORAGE POOLS

(75) Inventors: Owen Martin, Hopedale, MA (US);
Alex Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 505 days.

(21) Appl. No.: 12/592,988

(22) Filed: Dec. 7, 2009

(51) Int. Cl.
*G06F 13/00* (2006.01)

(52) U.S. Cl. ............ 710/15; 710/36; 718/105; 707/809; 711/170; 711/111; 711/114; 711/165; 711/167

(58) Field of Classification Search ............... 710/15, 710/36; 718/105; 707/809; 711/170, 111, 711/114, 165, 167
See application file for complete search history.

(56) References Cited

U.S. PATENT DOCUMENTS

| | | | |
|---|---|---|---|
| 5,206,939 | A | 4/1993 | Yanai et al. |
| 5,742,792 | A | 4/1998 | Yanai et al. |
| 5,778,394 | A | 7/1998 | Galtzur et al. |
| 5,845,147 | A | 12/1998 | Vishlitzky et al. |
| 5,857,208 | A | 1/1999 | Ofek |
| 7,643,428 | B1 * | 1/2010 | Dwekat et al. ............. 370/241 |
| 7,949,637 | B1 * | 5/2011 | Burke ......................... 707/655 |
| 7,984,259 | B1 * | 7/2011 | English ....................... 711/165 |
| 2003/0028722 | A1 * | 2/2003 | Bachmat et al. ........... 711/112 |
| 2006/0041718 | A1 * | 2/2006 | Ulrich et al. ............... 711/114 |
| 2006/0069887 | A1 | 3/2006 | LeCrone et al. |
| 2007/0038678 | A1 * | 2/2007 | Allen et al. ................. 707/200 |
| 2009/0070541 | A1 | 3/2009 | Yochai |
| 2010/0082505 | A1 * | 4/2010 | Hollingsworth et al. ....... 706/11 |

OTHER PUBLICATIONS

"EMC CLARiiON Virtual Provisioning, Applied Technology," EMC Corporation, White paper, Aug. 2008, 16 pp.
"EMC Symmetrix Virtual Provisioning, Applied Technology," EMC Corporation, White paper, Jun. 2008, 12 pp.
"Implementing Virtual Provisioning on EMC Symmetrix DMX with VMware Virtual Infrastructure," EMC Corporation, White paper, 2008, 30 pp.
U.S. Appl. No. 11/823,156, filed Jun. 27, 2007, Burke, et al.
U.S. Appl. No. 11/823,152, filed Jun. 27, 2007, Burke.
U.S. Appl. No. 11/903,869, filed Sep. 25, 2007, Veprinsky, et al.
U.S. Appl. No. 12/586,837, filed Sep. 29, 2009, LeCrone, et al.

* cited by examiner

*Primary Examiner* — Hong Kim
(74) *Attorney, Agent, or Firm* — Muirhead and Saturnelli, LLC

(57) ABSTRACT

A system for normalizing capacity utilization within virtual storage pools includes collecting utilization statistics across individual storage devices that are members of a virtualized storage pool. Using the pool utilization level statistics, pool members may be assigned a score and, according to that score, may be marked as source, target or neutral members. Based on the scores of each pool member, data may be migrated among pool members, in particular, from source members to target members. The process may be iterative such that the statistics and scores may be used only to perform a fraction of the data movement that would be needed to normalize the storage pool before the scores are then recalculated. In this way, the system may dynamically adapt to changing conditions within the pool such as device additions, removals and inefficient striping of new data.

17 Claims, 18 Drawing Sheets

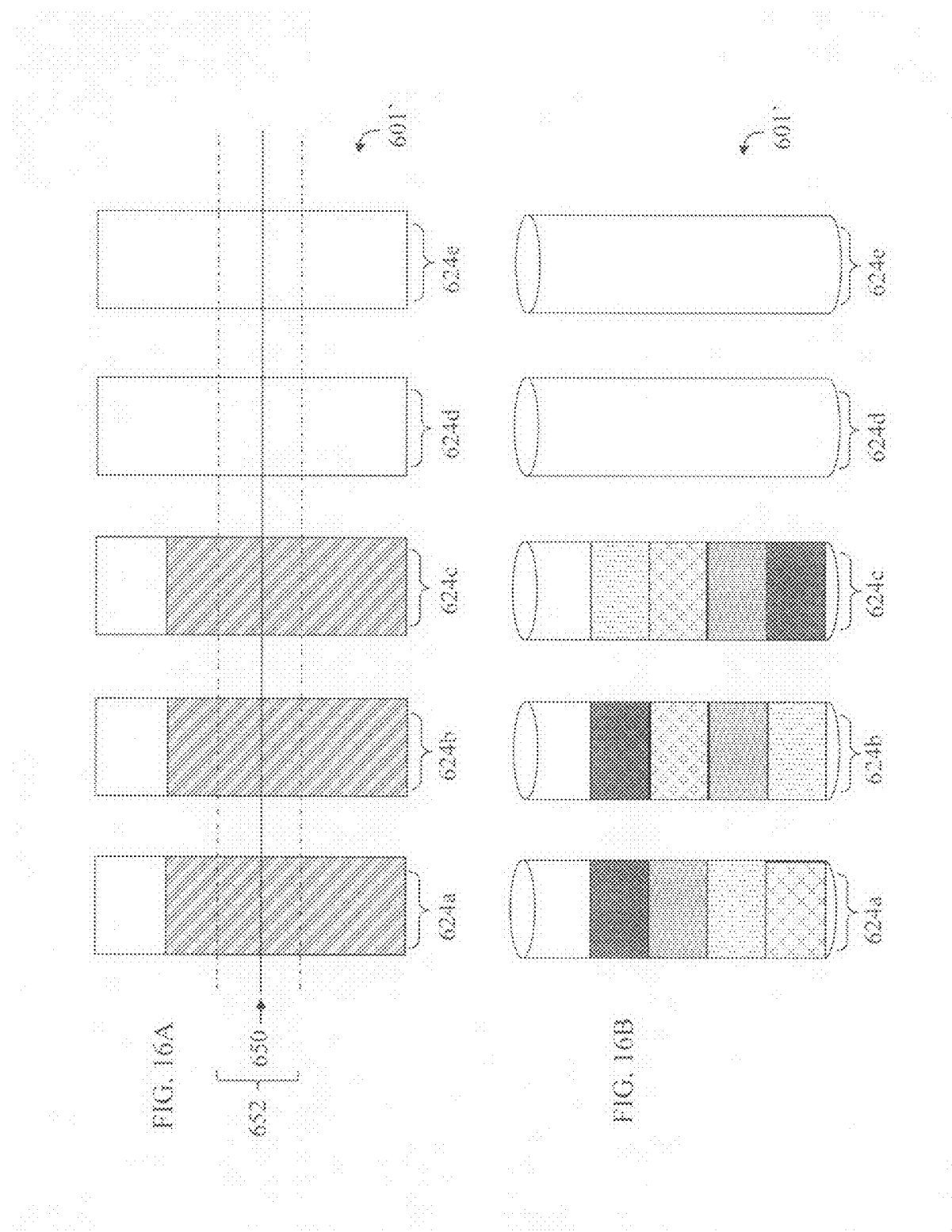

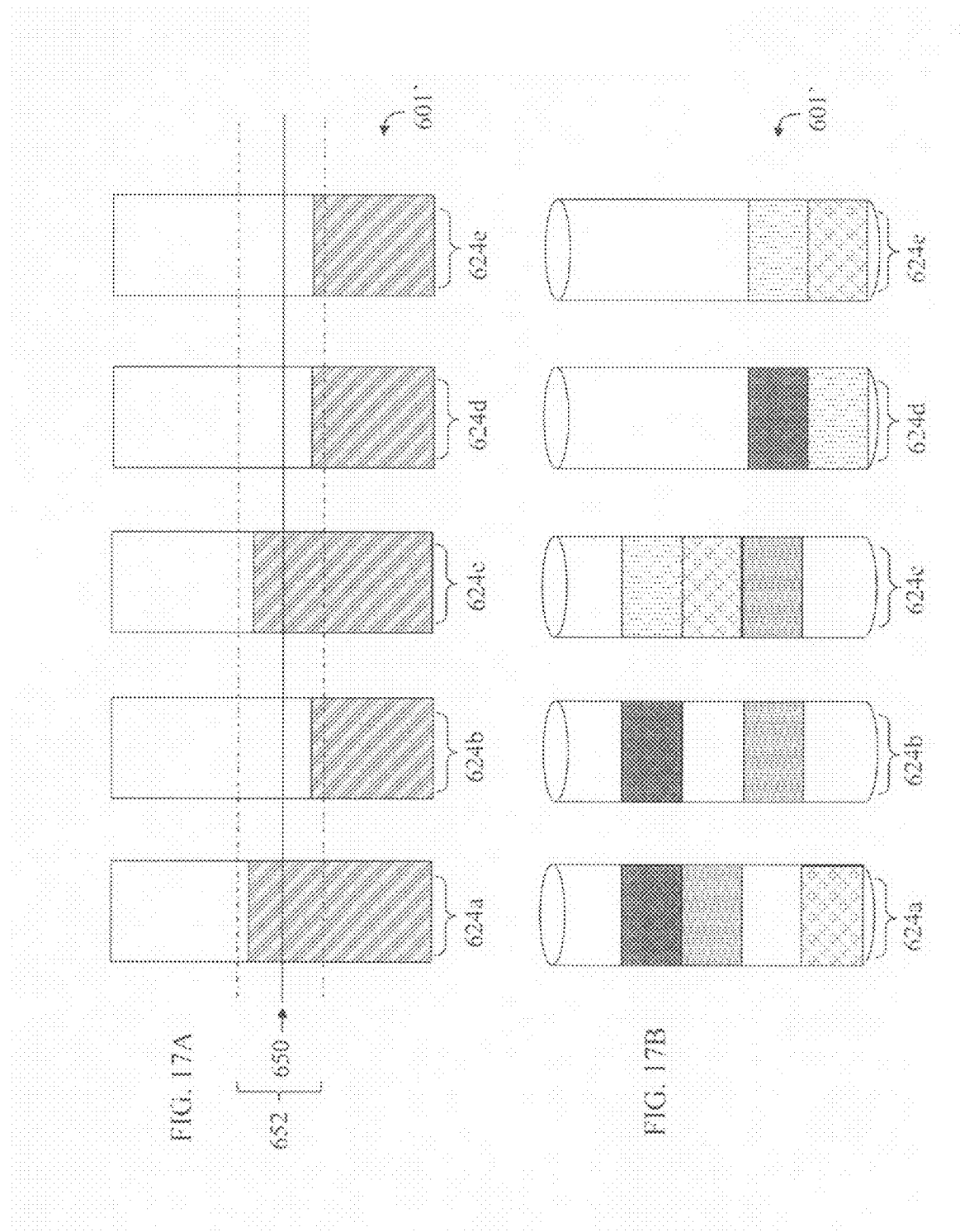

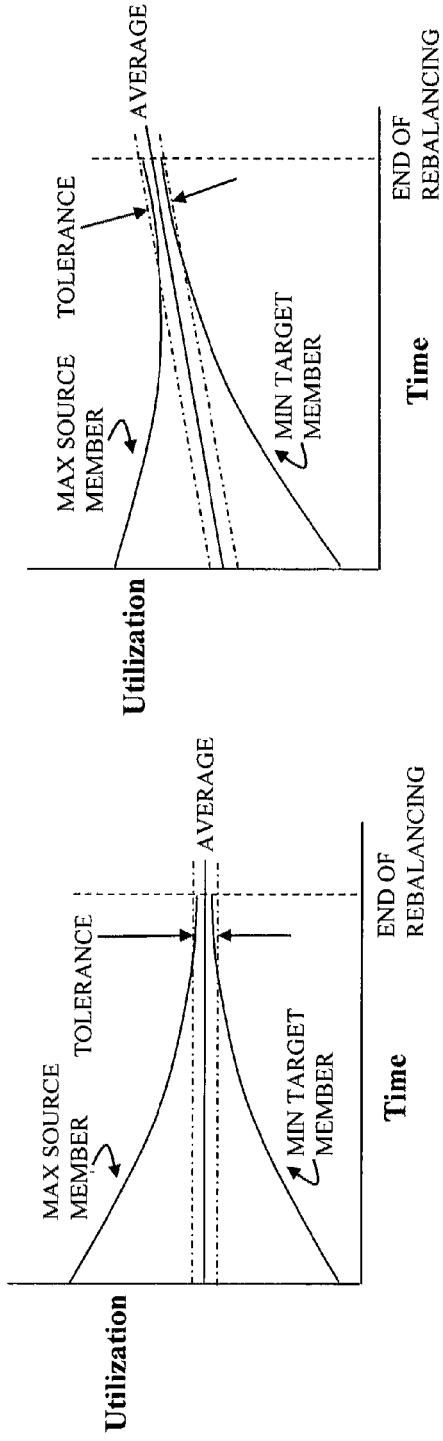
FIG. 18B
FIG. 18A
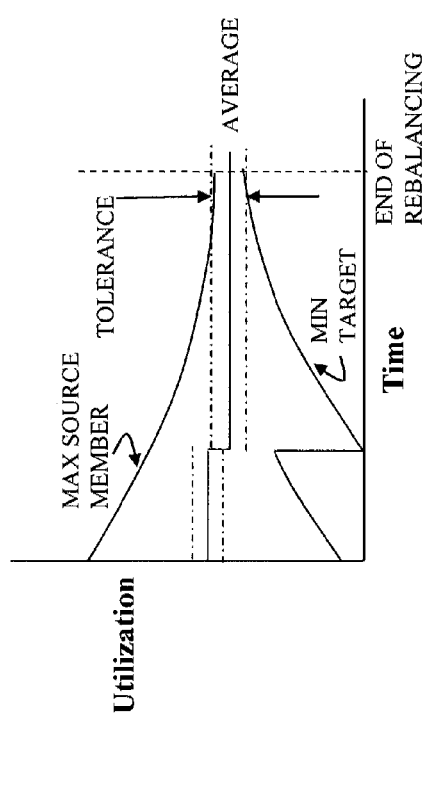
FIG. 18C

US 8,364,858 B1

NORMALIZING CAPACITY UTILIZATION WITHIN VIRTUAL STORAGE POOLS

TECHNICAL FIELD

This application relates to storage devices and, more particularly, to the field of data management of data stored on storage devices.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Data striping is a technique of segmenting logically sequential data so that segments can be assigned to multiple disk drives or other physical devices in a round-robin fashion and thus written concurrently. Data striping may be used in connection with RAID (redundant array of independent disks) storage systems and may be useful in situations where a processor is capable of reading or writing data faster than a single disk can supply or accept it. Specifically, in connection with accessing data that has been striped, while one data segment is being transferred from the first disk, a second disk can locate the next segment. Known management systems allow for the adjustment of the coarseness of the striping pattern and data striping may be used separately from or in conjunction with data mirroring techniques. Advantages of striping include improvements in performance and throughput.

In a storage system using data striping, a problem may occur concerning the unbalanced distribution of new data written to a virtualized storage pool of storage devices having logical volumes that map to physical storage areas. When new empty devices are added to an existing storage pool in which data is evenly striped across all pool members, as the older devices begin to approach 100% utilization, new data written to the pool is no longer able to be widely striped across all the pool members and instead becomes restricted to the new, less-utilized pool members.

Accordingly, it would be desirable to provide a system that may advantageously facilitate the normalization of utilized capacities of members of a storage pool in response to conditions of the storage pool.

SUMMARY OF THE INVENTION

According to the system described herein, a method of storage management in a storage pool having a plurality of pool members includes collecting utilization statistics of the storage pool. An average utilization level of the storage pool is determined. At least some of the plurality of pool members are classified according to the average utilization level, wherein the classified pool members of the plurality of pool members are classified as one of: source members, target members and neutral members. Stored data is selected from among the classified pool members. At least a portion of the selected data to be moved from at least a first one of the classified pool members to at least a second one of the classified pool members. The scheduled portion of the selected data is moved from the first one of the classified pool members to the second one of the classified pool members. Neutral members may have a utilization level that is within a tolerance range of the average utilization level. Source members may have a utilization level that exceeds the average utilization level and outside the tolerance range. Target members may have a utilization level that is below the average utilization level and outside the tolerance range. The first one of the classified pool members may be a source member and the second one of the classified pool members may be a target member. Selecting data from among the classified pool members may include selecting the data according to a random selection algorithm. It may further be determined whether the storage pool is normalized, the storage pool being determined as normalized if all of the classified pool members are neutral members each having a utilization level that is within a tolerance range of the average utilization level of the storage pool. Additionally, the method may be performed iteratively, wherein only a fraction of data sufficient to normalize the storage pool is selected and moved from the first one of the classified pool members to the second one of the classified pool members before performing another iteration.

According further to the system described herein, a computer readable storage medium stores computer software that manages storage in a storage pool having a plurality of pool members. The computer software includes executable code that collects utilization statistics of the storage pool. Executable code is provided that determines an average utilization level of the storage pool. Executable code is provided that classifies at least some of the plurality of pool members according to the average utilization level, wherein the classified pool members of the plurality of pool members are classified as one of: source members, target members and neutral members. Executable code is provided that selects stored data from among the classified pool members. Executable code is provided that schedules at least a portion of the selected data to be moved from at least a first one of the classified pool members to at least a second one of the classified pool members. Executable code is provided that moves the scheduled portion of the selected data from the first one of the classified pool members to the second one of the classified pool members. The neutral members may have a utilization level that is within a tolerance range of the average utilization level. The source members may have a utilization level that exceeds the average utilization level outside the tolerance range. The target members may have a utilization level that is below the average utilization level outside the tolerance range. The first one of the classified pool members may be a source member and the second one of the classified pool members may be a target member. The executable code that selects data from among the classified pool members may include executable code that selects the data according to a random selection algorithm. Executable code may be provided that determines whether the storage pool is normalized, the storage pool being determined as normalized if all of the classified pool members are neutral members each having a utilization level that is within a tolerance range of the average utilization level of the storage pool. Executable code may be provided that controls iterations of storage management processing of the storage pool, wherein only a fraction of data sufficient to normalize the storage pool is selected and moved from the first one of the classified pool members to the second one of the classified pool members before performing another iteration.

According further to the system described herein, a storage system includes a plurality of interconnected directors, wherein at least some of the directors handle reading and writing data for at least one storage device, and a plurality of storage volumes, coupled to at least some of the directors, that store data for the at least one storage device. A computer readable storage medium, provided in at least one of the directors, stores computer software for managing data within manages storage in a storage pool having a plurality of pool members. The computer software includes executable code that collects utilization statistics of the storage pool. Executable code is provided that determines an average utilization level of the storage pool. Executable code is provided that classifies at least some of the plurality of pool members according to the average utilization level, wherein the classified pool members of the plurality of pool members are classified as one of: source members, target members and neutral members. Executable code is provided that selects data from among the classified pool members. Executable code is provided that schedules at least a portion of the selected data to be moved from at least a first one of the classified pool members to at least a second one of the classified pool members. Executable code is provided that moves the scheduled portion of the selected data from the first one of the classified pool members to the second one of the classified pool members. The neutral members may have a utilization level that is within a tolerance range of the average utilization level. The source members may have a utilization level that exceeds the average utilization level outside the tolerance range. The target members may have a utilization level that is below the average utilization level outside the tolerance range. The computer readable storage medium may be provided in a director of a control device that is coupled to the plurality of storage volumes. The executable, code that selects data from among the classified pool members may include executable code that selects the data according to a random selection algorithm. Executable code may be provided that determines whether the storage pool is normalized. Executable code may be provided that controls iterations of storage management processing of the storage pool, wherein only a fraction of data sufficient to normalize the storage pool is selected and moved from the first one of the classified pool members to the second one of the classified pool members before performing another iteration.

BRIEF DESCRIPTION OF THE DRAWINGS

Embodiments of the system are described with reference to the several figures of the drawings, which are briefly described as follows.

FIGS. 16A and 16B are schematic illustrations of the capacity utilizations of the volumes and the storage allocation for data stored on the volumes immediately following the addition of the new empty volumes to the storage pool according to an embodiment of the system described herein.

FIG. 17A is a schematic representation of capacity utilization of the volumes after rebalancing processing is performed according to an embodiment of the system described herein and FIG. 17B is a schematic representation of resulting storage allocation for data stored on the volumes in the storage pool.

FIGS. 18A-C are graphs that schematically show normalizing effects of rebalancing operations on storage pools according to various embodiments of the system described herein.

DETAILED DESCRIPTION OF VARIOUS EMBODIMENTS

Figure 1:
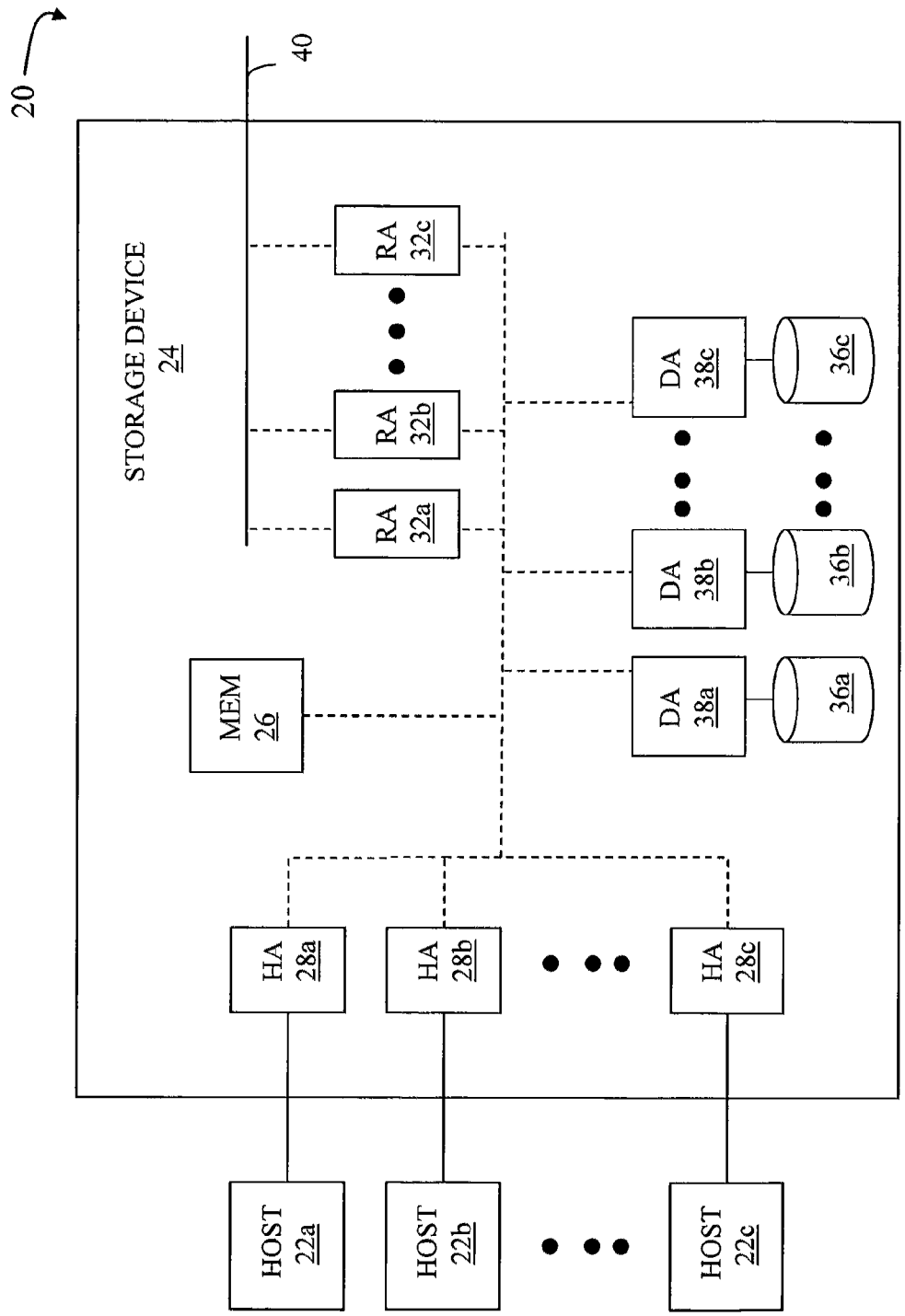
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but are used to transfer data between the storage device 24 and other storage devices (see FIG. 3 and corresponding description) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Patent App. Pub. No. 2006-0069887 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
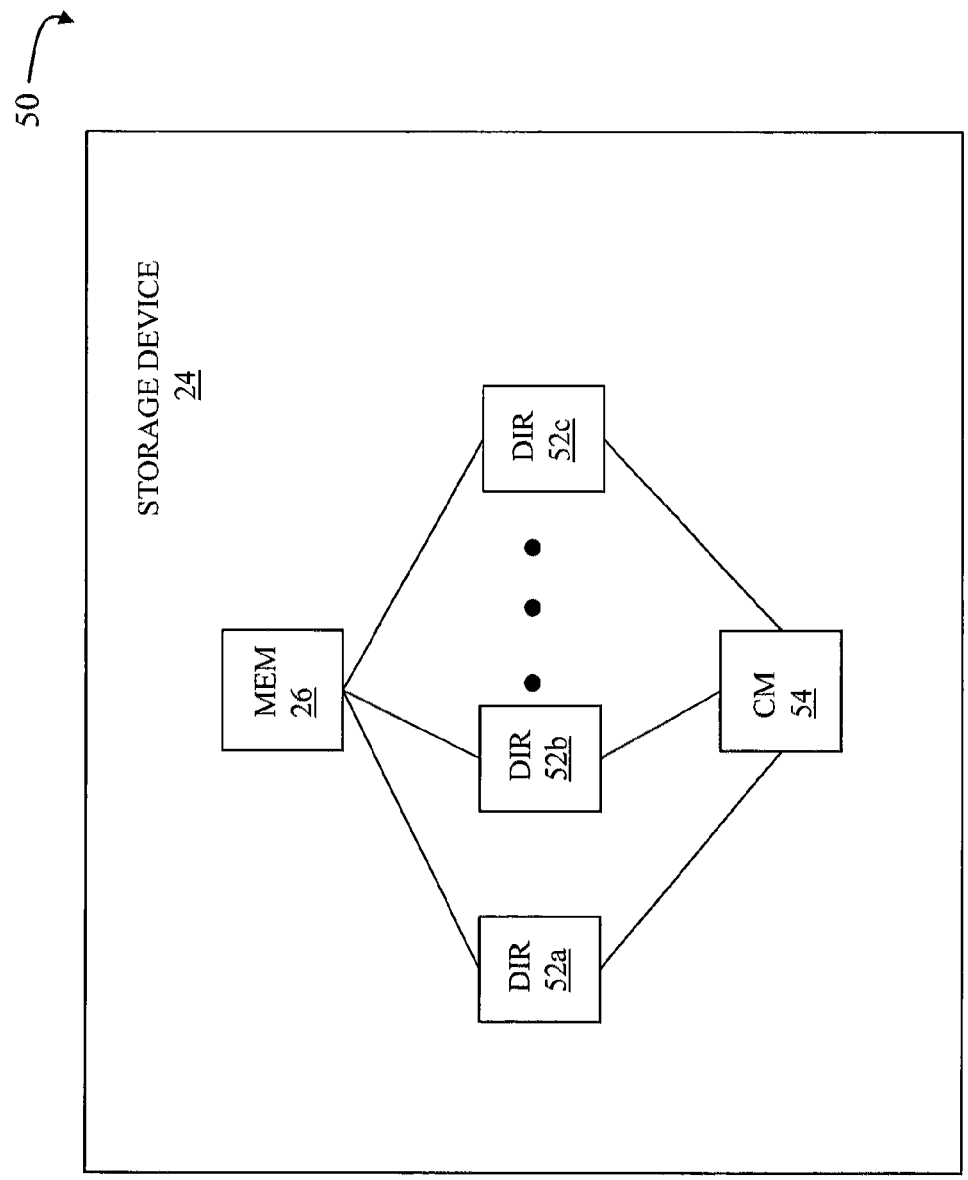
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
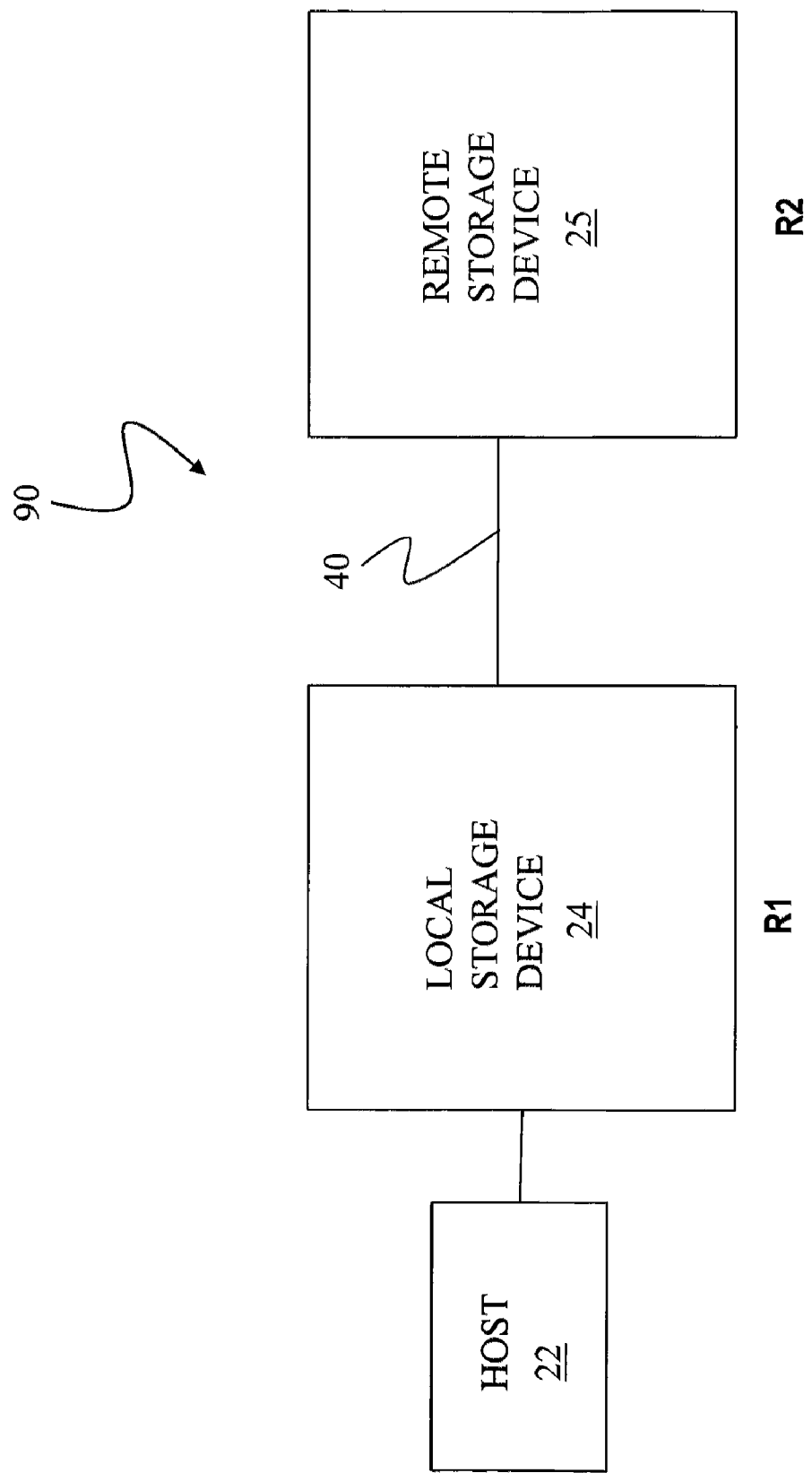
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 90 including the storage device 24, as a local storage device, coupled to a remote storage device 25 via the RDF link 40.

The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-22c, illustrated as a host 22, may read and write data from and to the logical device on the local storage device 24 and the RDF mapping causes modified data to be transferred from the local storage device 24 to the remote storage device 25 using the RA's 32a-32c and similar RA's on the remote storage device 25 that are connected via the RDF link 40. In steady state operation, the logical device on the remote storage device 25 may contain data that is a copy of, or at least substantially identical to, the data of the logical device on the local storage device 24. The logical device on the local storage device 24 that is accessed by the host 22 may be referred to as the "R1 volume" (or just "R1") while the logical device on the remote storage device 25 that contains a copy of the data on the R1 volume is called the "R2 volume" (or just "R2"). Thus, the host 22 reads and writes data from and to the R1 volume and RDF handles automatic copying and updating of the data from the R1 volume to the R2 volume and/or from the R2 volume to the R1 volume in accordance with the system described herein In an embodiment, the system described herein may be used in connection with SRDF synchronous (SRDF/S) transfers. For an SRDF/S transfer, data written from one of the hosts 22a-22c to the local storage device 24 may be stored locally, for example on one of the data volumes 36a-36c of the local storage device 24. After data is written from one or more of the hosts 22a-22c to the local storage device 24, the data is transferred from the local storage device 24 to the remote storage device 25 using RDF. Receipt by the remote storage device 25 is then acknowledged to the local storage device 24 which then provides an acknowledge back to the appropriate one of the hosts 22a-22c for the initial write. In other embodiments, the system described herein may also be used in connection with, or in combination with, other modes of data transfer including, for example, asynchronous (SRDF/A) transfers and/or other appropriate data transfer systems and devices.

Figure 4:
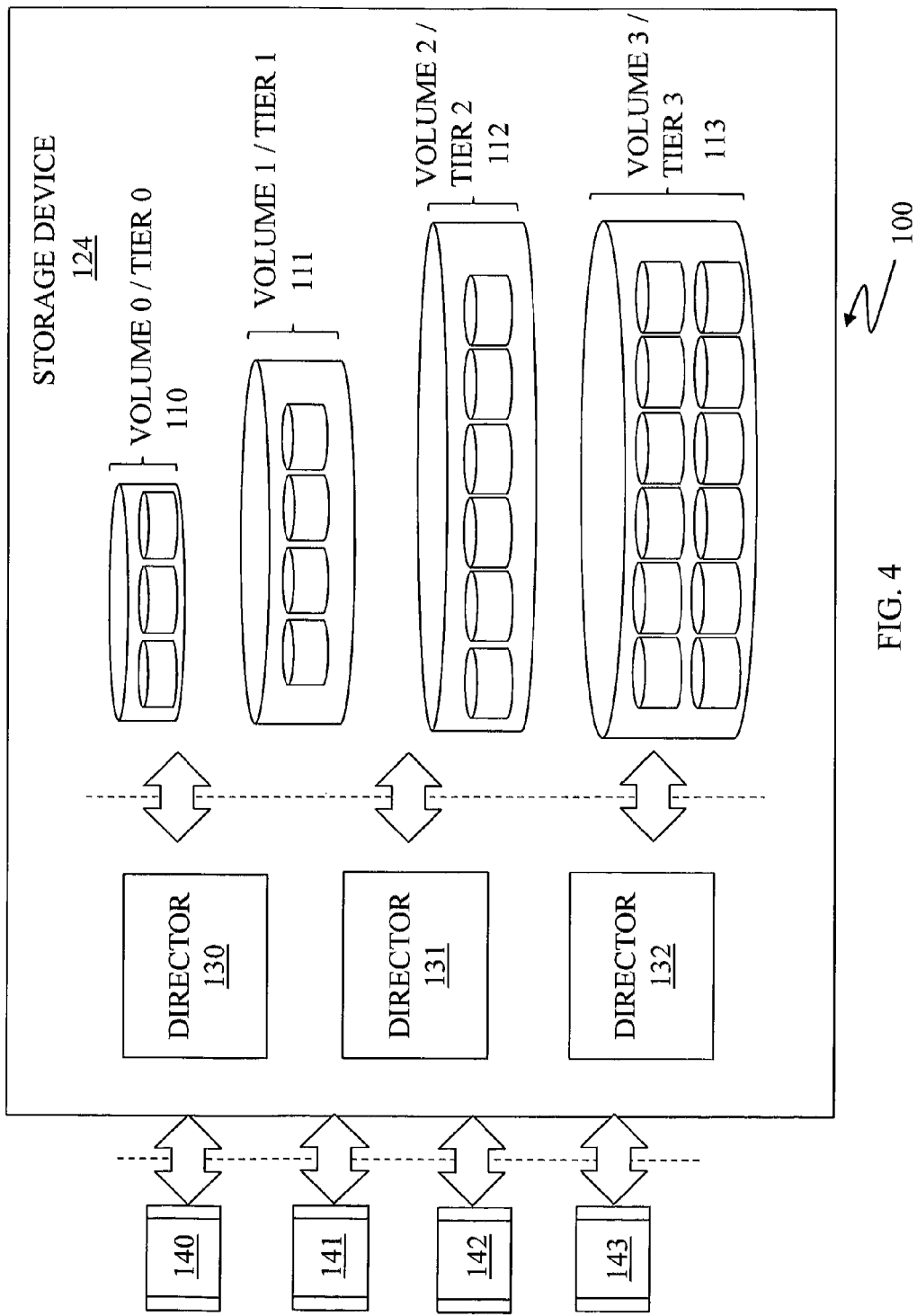
FIG. 4 is a schematic illustration showing a storage system according to an embodiment of the system described herein.

FIG. 4 is a schematic illustration showing a storage system 100 according to an embodiment of the system described herein. The storage system 100 may include a storage device 124 having multiple directors 130-132 and multiple storage volumes (VOLUMES 0-3) 110-113. Host applications 140-144 and/or other entities (e.g., other storage devices, SAN switches, etc.) request data writes and data reads to and from the storage device 124 that are facilitated using one or more of the directors 130-132. The storage device 124 may include similar features as that discussed in connection with the storage device 24 of FIGS. 1-3 with appropriate modifications made in accordance with the functionality discussed elsewhere herein.

The volumes 110-113 may be provided in multiple storage tiers (TIERS 0-3) that may have different storage characteristics, such as speed, cost, reliability, availability, security and/or other characteristics. Techniques involving the management of data between volumes on multiple storage tiers and/or between multiple storage tiers within a single volume, including the use of thin provisioning technology, is discussed, for example, in co-pending U.S. patent applications: U.S. Ser. No. 11/726,831 to Yochai et al., filed Mar. 23, 2007, entitled "Automated Information Life-Cycle Management With Thin Provisioning" and published as U.S. Patent App. Pub. No. 2009/0070541 A1; U.S. Ser. No. 11/823,156 to Burke et al., filed Jun. 27, 2007, entitled "Fine Grained Tiered Storage With Thin Provisioning"; U.S. Ser. No. 11/823,152 to Burke, filed Jun. 27, 2007, entitled "Storage Management For Fine Grained Tiered Storage With Thin Provisioning"; U.S. Ser. No. 11/903,869 to Veprinsky, filed Sep. 25, 2007, entitled "Date De-Duplication Using Thin Provisioning"; and U.S. Ser. No. 12/586,837 to LeCrone et al., filed Sep. 29, 2009, entitled "Sub-Tiering Data At The Volume Level", which are all incorporated herein by reference. According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage.

Figure 5:
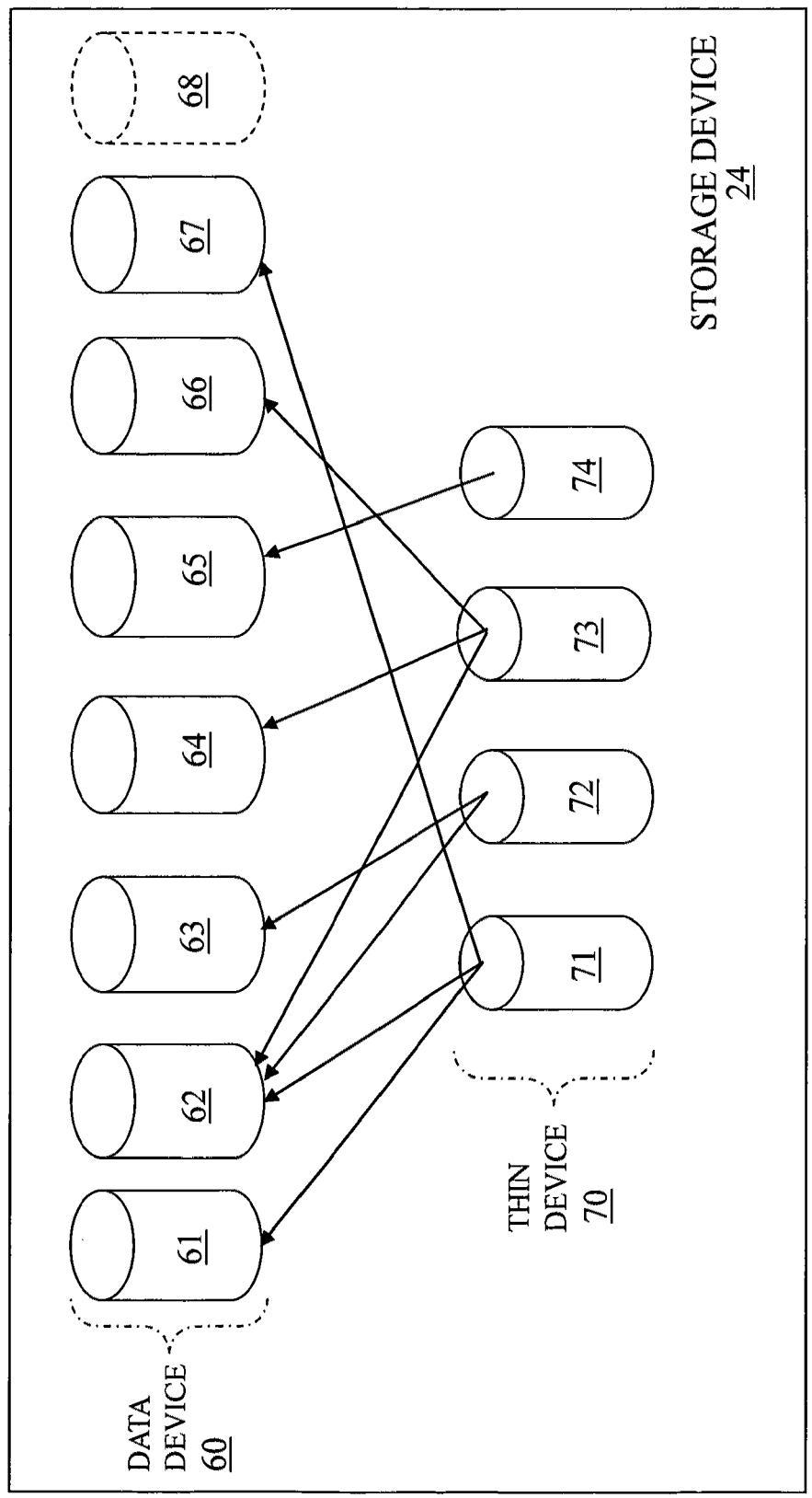
FIG. 5 is a schematic diagram showing the storage device as including one or more data devices and one or more thin devices according to an embodiment of the system described herein.

FIG. 5 is a schematic diagram showing the storage device 24 as including a plurality of data devices 61-68 and a plurality of thin devices 71-74 that may be used in connection with the system described herein. Alternatively, in other embodiments that may be used in connection with the system described herein, instead of being separate devices, the data devices 61-68 may be sections of one data device 60 and, similarly, the thin devices 71-74 may be sections of one thin device 70. Further, the thin devices 71-74, and/or sections of the thin device 70, may be incorporated into the storage device 24 and/or may be stored and accessed externally to the storage device 24. The data devices 61-68 may be implemented as a logical device like standard logical devices provided in a Symmetrix data storage device produced by EMC Corporation of Hopkinton, Mass. The data device section 68 is illustrated with broken lines to indicate that the data device section 68 does not yet exist but may be created, as further discussed elsewhere herein. In some embodiments, the data device sections 61-67 may not be directly useable (visible) to hosts coupled to the storage device 24. Each of the data devices sections 61-67 may correspond to a portion (including a whole portion) of one or more of the disk drives 42-44. Thus, for example, the data device section 61 may correspond to the disk drive 42, may correspond to a portion of the disk drive 42, or may correspond to a portion of the disk drive 42 and a portion of the disk drive 43. The data devices sections 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

The thin devices 71-74 may appear to a host coupled to the storage device 24 as a logical volume (logical device) containing a contiguous block of data storage. Each of the thin devices 71-74 may contain pointers to some or all of the data devices 61-67 (or portions thereof), as further discussed elsewhere herein. As illustrated, in some embodiments, only one thin device may be associated with a data device while, in other embodiments, multiple thin devices may be associated with the same data devices. In some instances, an implementation according to the system described herein may allow for hybrid logical devices where a single logical volume has portions that behave as a data device and/or portions that behave as a thin device.

A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to one or more data devices, which are logical devices that map logical storage space of the data device to physical storage space on the disk drives 36a-36c. As further discussed elsewhere herein, an access of the logical storage space of the thin device results in either a null pointer (or equivalent) indicating that no corresponding physical storage space has yet been allocated, or results in a reference to a data device (or section thereof) which in turn references the underlying physical storage space.

Figure 6:
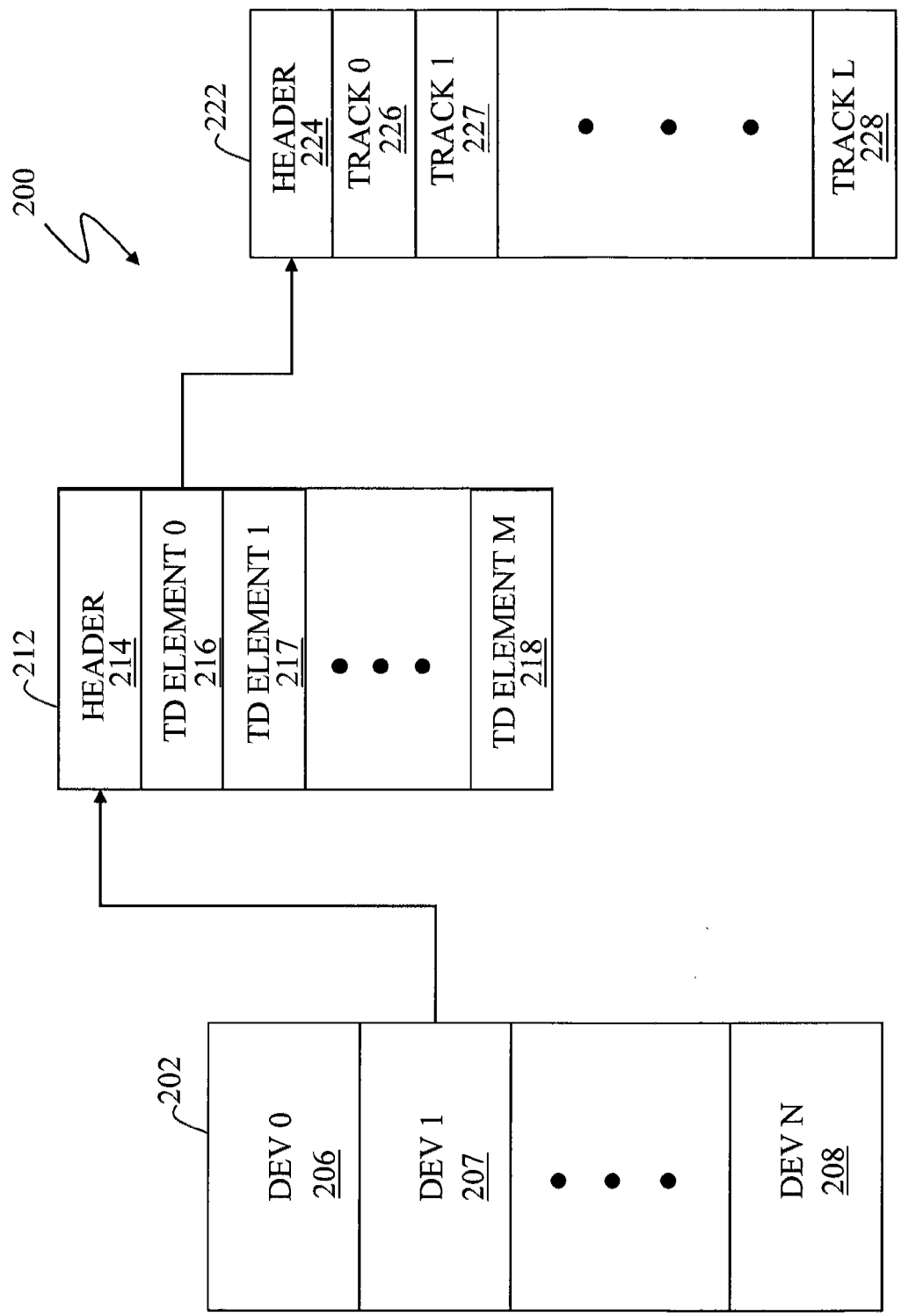
FIG. 6 is a schematic diagram illustrating tables that are used to keep track of device information according to an embodiment of the system described herein.

FIG. 6 is a diagram 200 illustrating tables that are used to keep track of device information according to an embodiment of the system described herein. A first table 202 corresponds to all of the devices used by a storage device or by an element of a storage device, such as an HA and/or a DA. The table 202 includes a plurality of logical device (logical volume) entries 206-208 that correspond to all the logical devices used by the storage device (or portion of the storage device). The entries in the table 202 may include information for thin devices, for data devices, for standard logical devices, for virtual devices, for business continuance volume (BCV) devices, and/or any or all other types of logical devices used in connection with the system described herein.

Each of the entries 206-208 of the table 202 correspond to another table that may contain information for one or more sections of a logical volume, such as a thin device logical volume. For example, the entry 207 may correspond to a thin device table 212. The thin device table 212 may include a header 214 that contains overhead information, such as information identifying the corresponding thin device, information concerning the last used data device and/or other information including counter information, such as a counter that keeps track of used group entries (described below). The header information, or portions thereof, may be available globally to the storage device 24.

The thin device table 212 may include one or more group elements 216-218, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 216-218 (for example, the group element 216) of the thin device table 212 may identify a particular one of the data devices 61-67 having a track table 222 that contains further information, such as a header 224 having overhead information and a plurality of entries 226-228 corresponding to each of the tracks of the particular one of the data device sections 61-67. The information in each of the entries 226-228 may include a pointer (either direct or indirect) to the physical address on one of the disk drives 36a-36c of the storage device 24 (or a remote storage device 25 if the system is so configured) that maps to the logical address(es) of the particular one of the data devices 61-67. Thus, the track table 222 may be used in connection with mapping logical addresses of the logical device sections corresponding to the tables 202, 212, 222 to physical addresses on the disk drives 36a-36c of the storage device 24.

The tables 202, 212, 222 may be stored in the global memory 26 of the storage device 24. In addition, the tables corresponding to particular logical device sections accessed by a particular host may be stored (cached) in local memory of the corresponding one of the HA's 28a-28c. In addition, the RA's 32a-32c and/or the DA's 38a-38c may also use and locally store (cache) portions of the tables 202, 212, 222.

Figure 7:
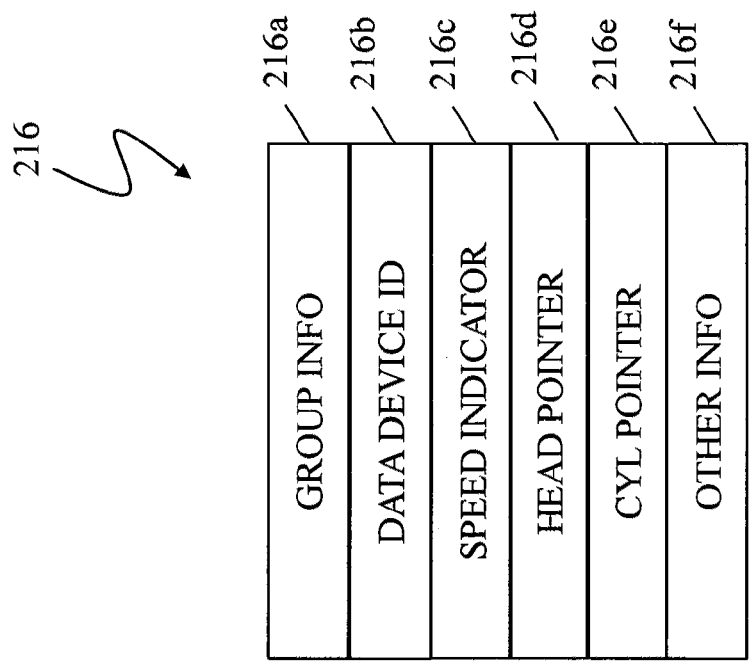
FIG. 7 is a schematic diagram illustrating a group element of the thin device table in connection with an embodiment of the system described herein.

FIG. 7 is a schematic diagram illustrating a group element 216 of the thin device table 212 in connection with an embodiment of the system described herein. The group element 216 may includes a plurality of entries 216a-216f. The entry 216a may provide group information, such as a group type that indicates whether there has been physical address space allocated for the group. The entry 216b may include information identifying one (or more) of the data devices 61-67 that correspond to the group (i.e., the one of the data devices 61-67 that contain pointers for physical data for the group). The entry 216c may include other identifying information for the one of the data devices 61-67, including a speed indicator that identifies, for example, if the data device is associated with a relatively fast access physical storage (disk drive) or a relatively slow access physical storage (disk drive). Other types of designations of data device sections are possible (e.g., relatively expensive or inexpensive, RAID protection type, numbered of mirrored copies, etc.). The entry 216d may be a pointer to a head of the first allocated track for the one of the data devices 61-67 indicated by the ID entry 216b. Alternatively, the entry 216d may point to header information of the data device track table 222 immediately prior to the first allocated track. The entry 216e may identify a cylinder of a first allocated track for the one the data devices 61-67 indicated by the ID entry 216b. The entry 216f may contain other information corresponding to the group element 216 and/or the corresponding thin device. In other embodiments, entries of the group table 216 may identify a range of cylinders of the thin device and a corresponding mapping to map cylinder/track identifiers for the thin device to tracks/cylinders of a corresponding data device. In an embodiment, the size of the group element 216 may be eight bytes.

Figure 8:
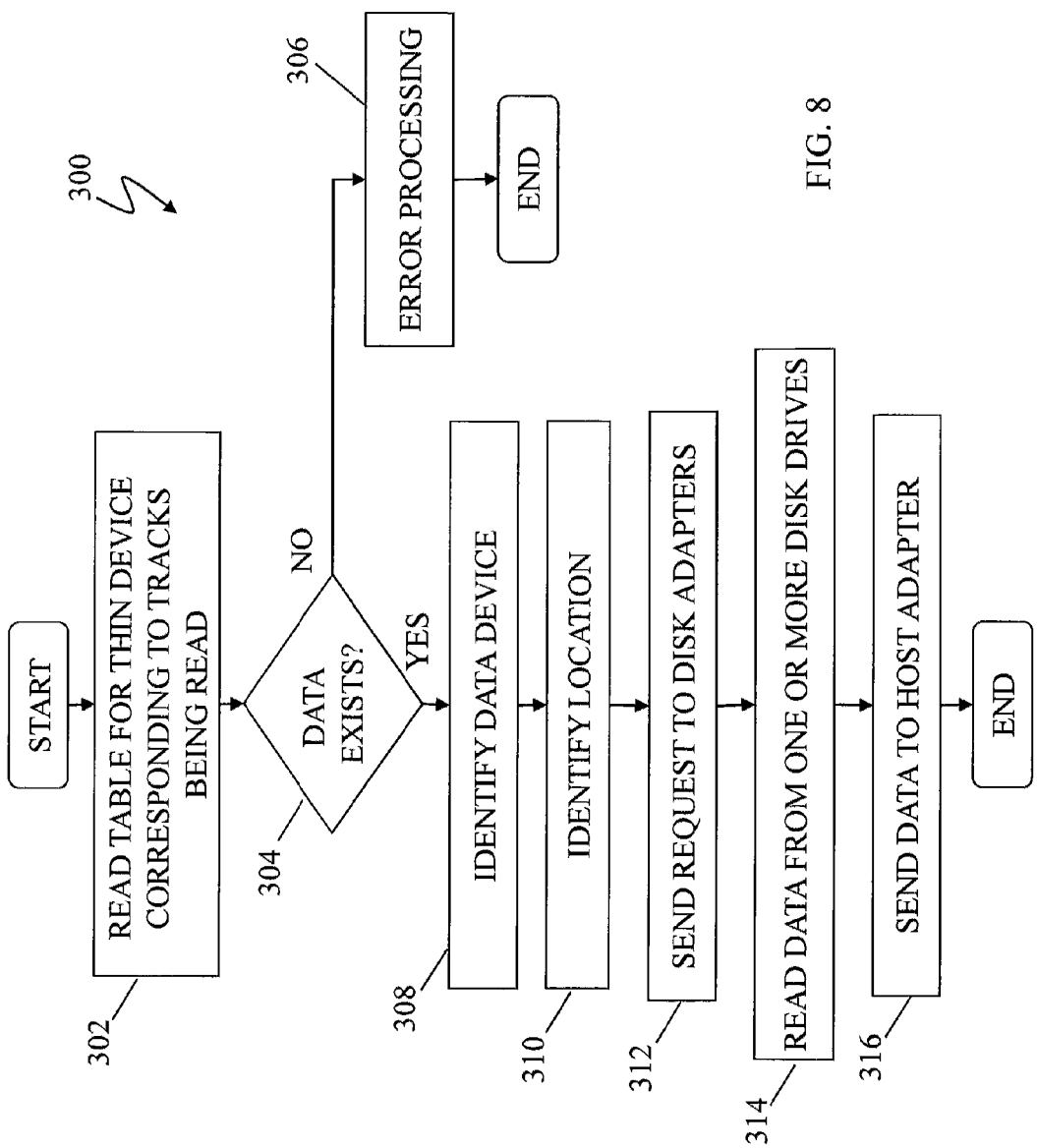
FIG. 8 is a flow diagram illustrating processing for handling a read of one or more logical tracks of one of the thin devices according to an embodiment of the system described herein.

FIG. 8 is a flow diagram 300 illustrating processing for handling a read of one or more logical tracks of one of the thin devices 71-74 in an embodiment of the system described herein. In a step 302, an appropriate one of the host adapters 28a-28c reads the group table 212 of the one of the thin devices 71-74 corresponding to the logical tracks being read. After the step 302, at a test step 304, it is determined whether the logical tracks identified from the group table 212 corresponds to any of the data devices 61-67 (i.e., if there is physical data corresponding to the logical tracks being read). If there is no corresponding physical data (meaning that no logical track(s) were ever written), then processing proceeds to a step 306 where error processing is performed, such as returning a NULL value to the host. Other appropriate error processing may be performed at the step 306. After the step 306, processing is complete.

If it is determined at the step 304 that there is physical data corresponding to the logical tracks being read, then processing proceeds to a step 308 where one or more of the data devices 61-67 associated with the logical tracks being read are identified from the group table 212. After the step 308, processing proceeds to a step 310 where the track table 222 is read from the identified one or more of the data devices 61-67 and the corresponding location of the physical data (i.e., cylinder and track) is determined. Logical storage space maps to physical storage space of the physical devices. After the step 310, processing proceeds to a step 312 where a request may be sent to one or more disk adapters 38a-38c corresponding to disk drives 36a-36c that provide the physical storage space associated with the identified one of the data devices 61-67 and corresponding location information. After the step 312, processing proceeds to a step 314 where the physical data is read. Note that the data may be stored in a cache or other memory (for example, the memory 26) in connection with being read. In some cases, if the data being read is already in the cache, then the processing at the step 812 and following steps may not be necessary. Note also that reading the data may include updating any metadata used to provide the processing described herein, such as the time last accessed, the host/user making the request, frequency of use, and/or any other appropriate metric. After the step 314, processing proceeds to a step 316 where the data may be received by an appropriate one of the host adapters 28a-28c (e.g., by reading the memory 26). After the step 316, processing is complete.

Figure 9:
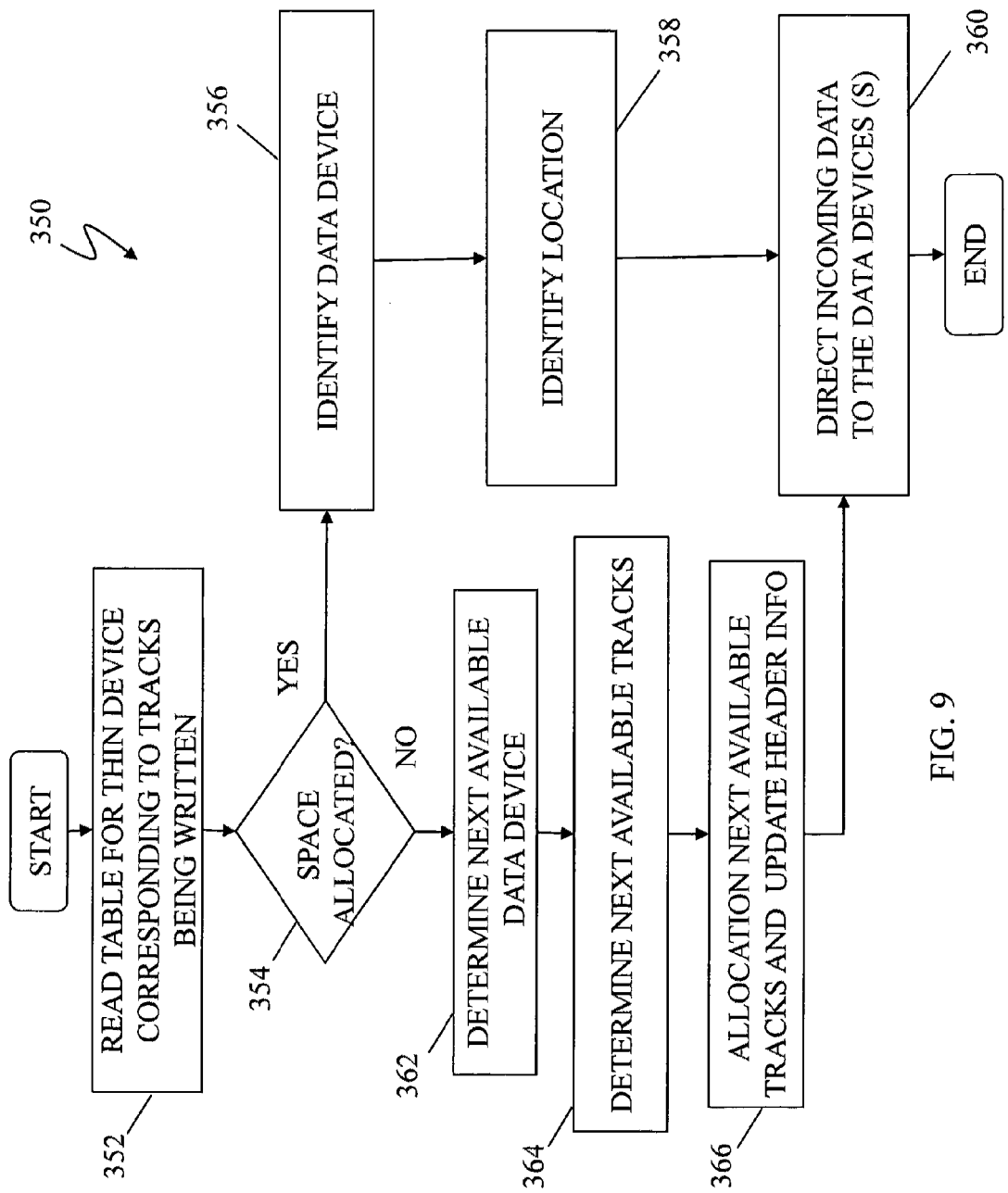
FIG. 9 is a flow diagram illustrating processing for handling a write of logical track(s) to one or more of the thin devices in connection with the system described herein.

FIG. 9 is a flow diagram 350 illustrating processing for handling a write of logical track(s) to one or more of the thin device(s) 71-74 in connection with the system described herein. At a step 352, an appropriate one of the host adapters 28a-28c reads the group table 212 of the one or more of the thin devices 71-74 corresponding to the logical tracks being written.

Following the step 352 is a test step 354 where it is determined whether physical space had been previously allocated (i.e., in a prior write operation) for the tracks being written. If so, then processing proceeds to a step 356 where the data device that includes the tracks is identified. After the step 356, is a step 358 where the track table 222 is read from the identified one or more of the data devices 61-67 and the corresponding location of the physical data (i.e., cylinder and track) is determined. As further discussed elsewhere herein, physical storage space may be provided in connection with one data device including a concatenation of multiple data device portions. Storage space of the physical devices maps to logical storage space of the data devices. Following the step 358 processing proceeds to a step 360 where the data being written is directed to the appropriate physical storage space. As further discussed elsewhere herein, data may be written among multiple devices in a striping process in which data is advantageously striped across the multiple devices. After the step 360, processing is complete.

If it is determined at the step 354 that there is no physical storage that has been allocated for the logical track(s) being written, then control transfers to a step 362, where a next available data device identifier (i.e., the data device 68) is determined. This information may be obtained from the header 214 of the device table 212.

After the step 362, processing proceeds to a step 364 where available physical storage space on the disk drives 36a-36c is determined. In an embodiment herein, available physical storage space is allocated sequentially from one or more of the disk drives 36a-36c. Following the step 364 is a step 366 where a request may be sent to a disk adapter 38a-38c (or possibly the RA's 32a-32c) to allocate the physical storage space for the write. Also at the step 366, header info is updated to reflect the newly allocated data device and physical tracks. After the step 366, processing proceeds to the step 360, discussed above, where the data being written is directed to the one or more data device sections. After the step 360, processing is complete.

After the above-described read and write processes, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 212 (for example, the entry 216f of the group element 216). Alternatively, the, data characteristic information may be stored in a memory, such as the global memory 26 of the storage device 24, and a pointer to this information stored in the group element 216. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated. In some embodiments, used physical storage space may not exceed 30% of the provisioned storage space.

As discussed elsewhere herein, the data devices 61-68 may be associated with physical storage areas (e.g., disk drives, tape, solid state storage, etc.) having different characteristics. In various embodiments, the physical storage areas may include multiple sub-tiers of storage in which each sub-tier of storage areas and/or disk drives that may be ordered according to different characteristics and/or classes, such as speed, technology and/or cost. The thin devices 71-74 may appear to a host coupled to the storage device 24 (and/or, e.g., the storage device 124) as a logical volume (logical device) containing a contiguous block of data storage, as discussed herein. Each of the thin devices 71-74 may correspond to a particular data device, a portion thereof and/or multiple data devices. Accordingly, each of the thin devices 71-74 may map to storage areas across multiple storage volumes. As a result, although each of the thin devices 71-74 may appear as containing a logically contiguous block of storage, each of the thin devices 71-74 may allow for blocks of data to be transparently stored (and/or retrieved) from discontiguous storage pools made up of the varying classes of storage. In this way, the granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume. It is also noted that, in other embodiments, the thin device 70 may be a metavolume of concatenated thin volumes/devices, as further discussed elsewhere herein.

Figure 10:
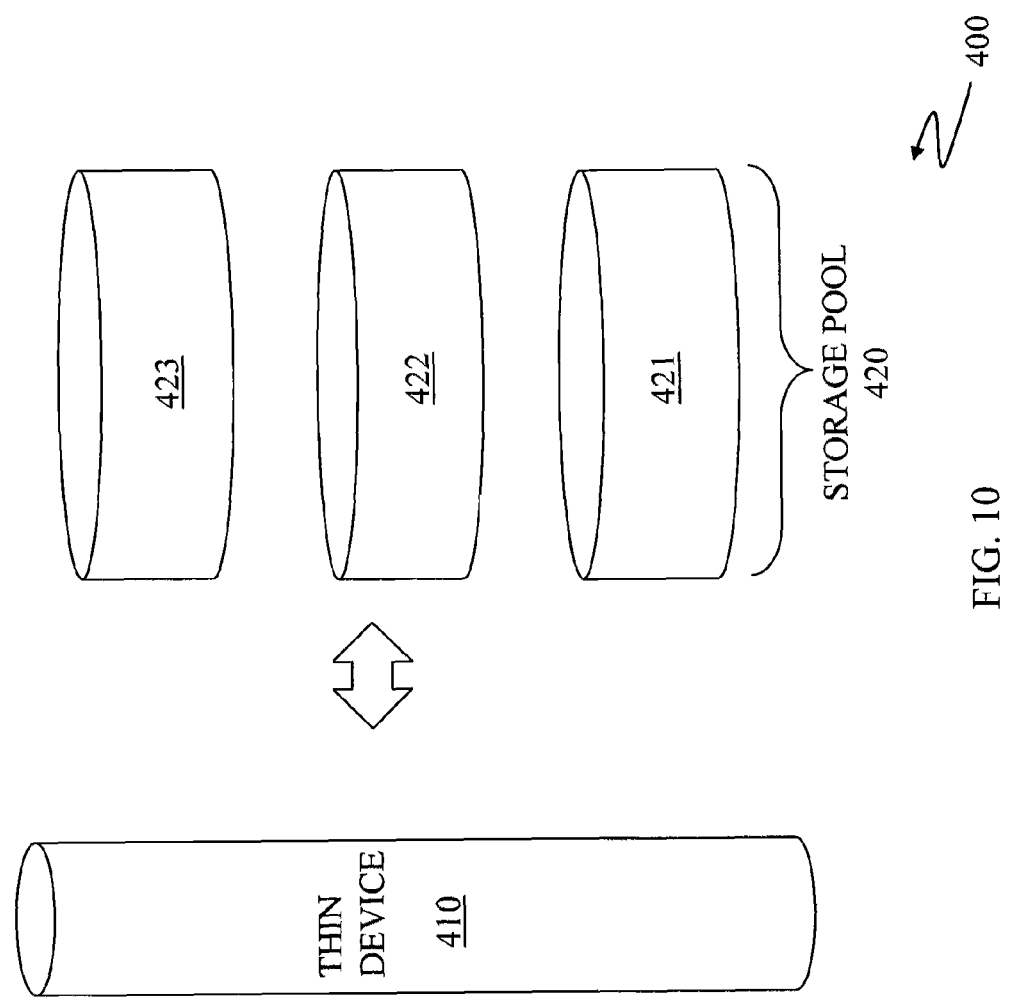
FIG. 10 is a schematic illustration of a storage system including thin provisioning features according to an embodiment of the system described herein.

FIG. 10 is a schematic illustration of a storage system 400 including thin provisioning features according to an embodiment of the system described herein. A thin device 410, that may be like the thin devices 71-74 discussed elsewhere herein, is shown coupled to multiple storage volumes 421-423 forming a storage pool 420 accessible to the thin device 410. As discussed elsewhere herein, each of the volumes 421-423 may include one or more data devices, like the data devices 61-68 discussed elsewhere herein, that map to physical storage areas. The volumes 421-423 may be part of one or more storage devices like that further discussed elsewhere herein.

The thin device 410 may map to the different storage volumes 421-423 although, as noted above, the mapping may not be a direct mapping to physical storage space. A particular thin device may indicate a maximum amount of physical storage space that could be allocated for the thin device (provisioned storage space) even though the corresponding physical storage space has not yet been allocated. As discussed herein, the granularity of the system described herein may be less than at the file level and allow for blocks of data of any size to be stored across multiple storage volumes 421-423 in a process that is transparent to the host and/or host application.

Figure 11:
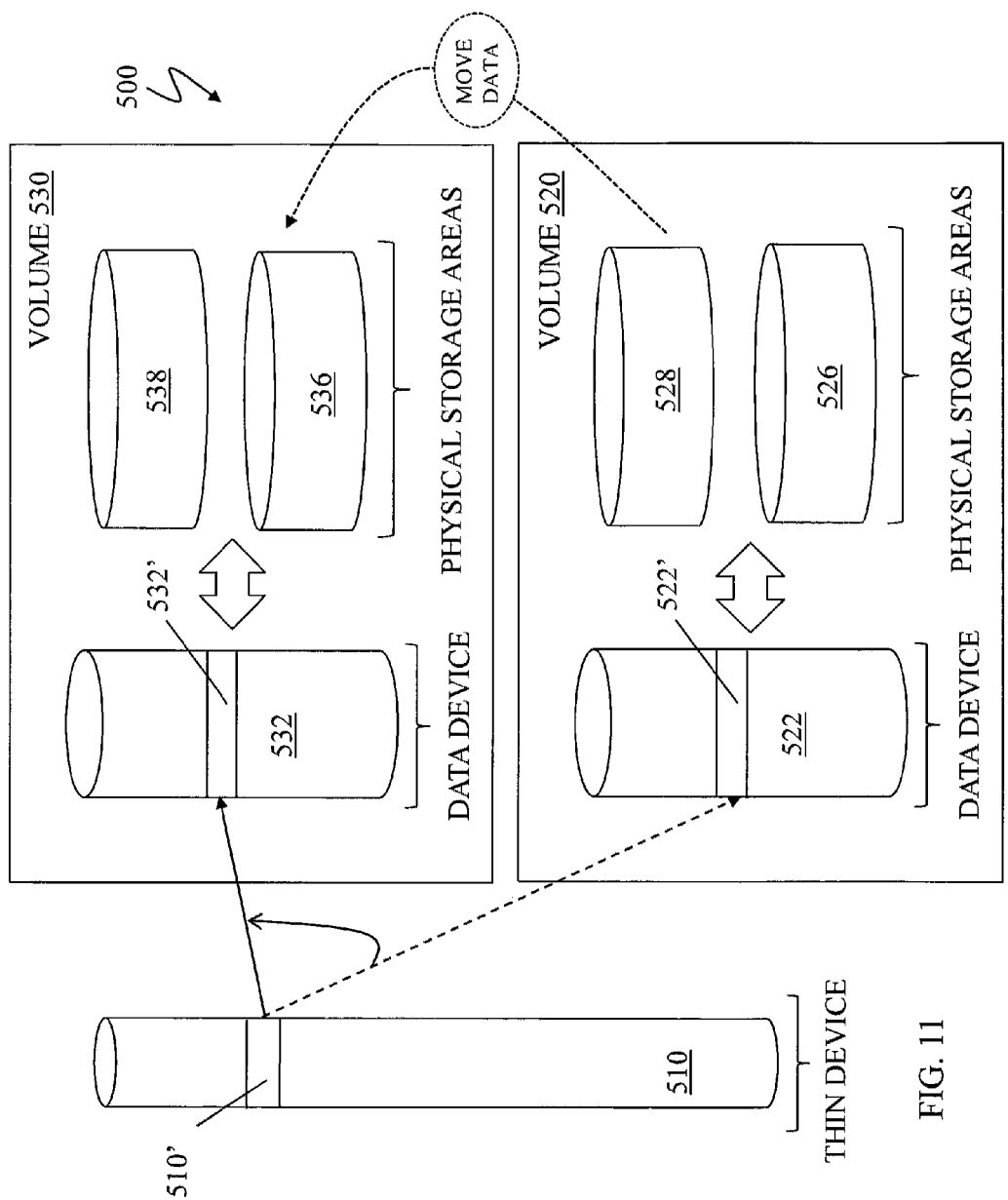
FIG. 11 is a schematic illustration showing a storage device in connection with movement of data using thin provisioning according to an embodiment of the system described herein.

FIG. 11 is a schematic illustration showing an embodiment of a storage system 500 described in connection with movement of data from one storage area to a different storage area involving thin provisioning features according to an embodiment of the system described herein. The storage system 500 may include a thin device 510 and one or more volumes 520, 530. Each of the volumes 520, 530 may include a data device 522, 532 associated with respective physical storage areas 526, 528, 536, 538. Note that, in various embodiments, the thin device 510 may be incorporated into one or more of the volumes 520, 530 and/or be a device that is stored and/or accessed separately therefrom.

According to an embodiment of the system described herein, a portion 510' of the thin device 510 may point to a portion 522' of the data device 522 in connection with a mapping of data stored on the storage volume 520 to one of the physical storage areas 526, 528 of the volume 520. In an embodiment, in connection with moving data from the volume 520 to the volume 530, the pointer from the thin device portion 510' may be modified to point to a new portion 532' of a data device 532 that maps to the new location of the data on the physical storage areas 536, 538 of the volume 530. As further discussed elsewhere herein, data may be moved among volumes of one or more storage pools according to the system described herein to normalize utilization of the storage volumes for purposes of appropriately striping data across volumes of the storage pool following the addition of new (empty) volumes to a storage system. It is also noted that in various embodiments, the system described herein may also be appropriately used in connection with "sparse cloning" that allows for more than one thin device to point to a data device as way of providing an efficient cloning mechanism. In this way, cloning operations may be almost instantaneous, involving just the setting of pointers, and initially consume little or no additional physical storage space.

Figure 12:
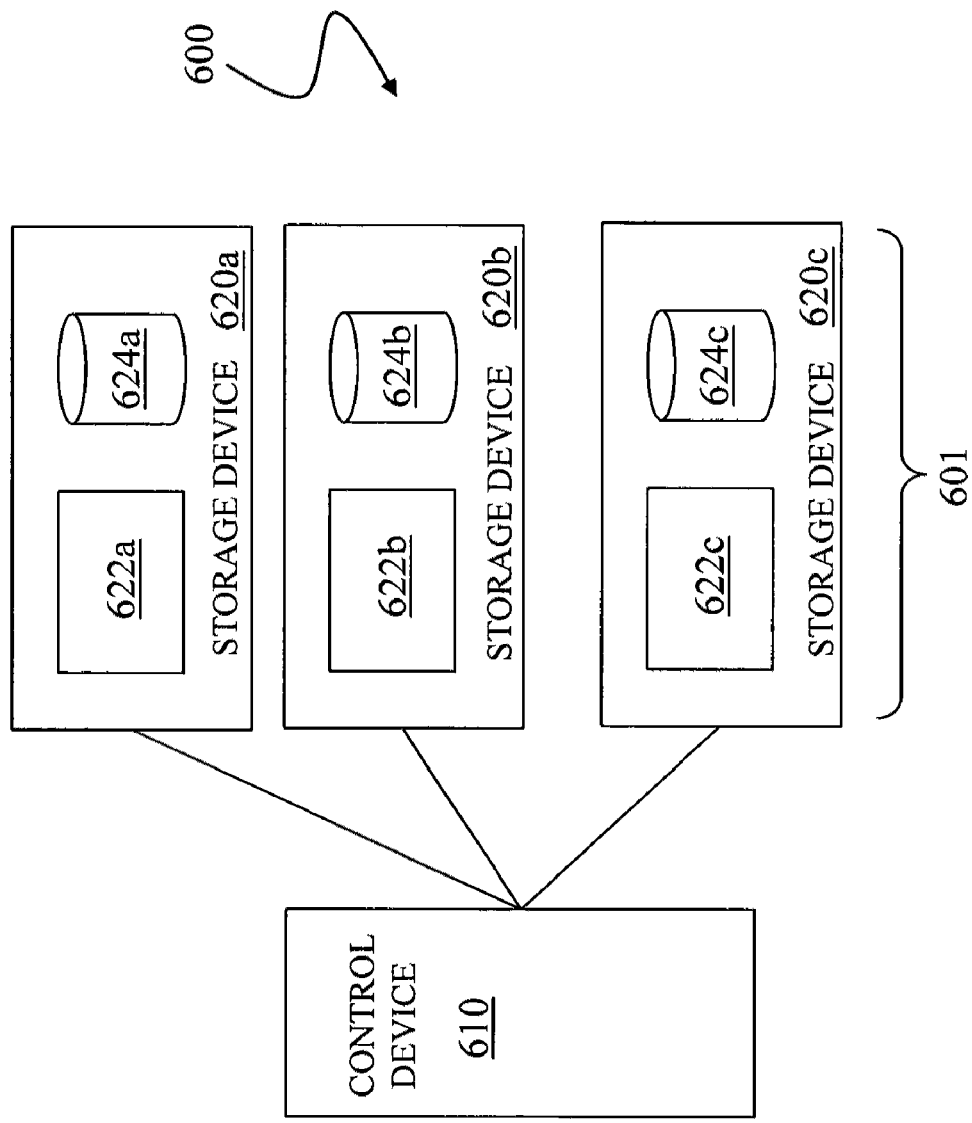
FIG. 12 is a schematic illustration of an embodiment of a storage system that may be used in connection with the system described herein.

FIG. 12 is a schematic illustration of an embodiment of a storage system 600 that may be used in connection with the system described herein. For example, the storage system 600 may be a RAID system. The storage system 600 is shown to storage devices 620a-c, that may each include at least one director 622a-c coupled to at least one volume 624a-c, like that further discussed elsewhere herein, and that together form a storage pool 601. A control device 610 may be provided that is in communication with storage devices 620a-c. The control device 610 may include one or more thin devices, like the thin devices 71-74, and may include other components to perform functions of the system described herein, including, for example, one or more devices to collection utilization statistics of the storage devices and processors to process received information, as further discussed elsewhere herein. It is noted that in various embodiments of RAID systems, one or more of the storage devices 620a-c may be a parity device that is used in connection with error correction capability of the RAID system including the use of parity information that is stored on the parity device. Alternatively, it is also noted that parity information may be stored across the storage devices 620a-c rather than being stored in one parity device. Furthermore, in various embodiments, the system described herein may include operations involving communication between the storage devices 620a-c of the RAID system to provide mirrored copies of the data blocks replicated across the multiple storage devices and/or operations with portions of the data blocks that are distributed across the multiple storage devices (i.e. striping). Although illustrated with discrete storage devices, in various embodiments, the storage system 600 may include any number of different configurations of disks, disk drives or other storage media coupled to one or more interconnected directors, and it should be noted that other configurations and types of systems involving multiple, redundant storage may be used in connection with the system described herein.

Figure 13:
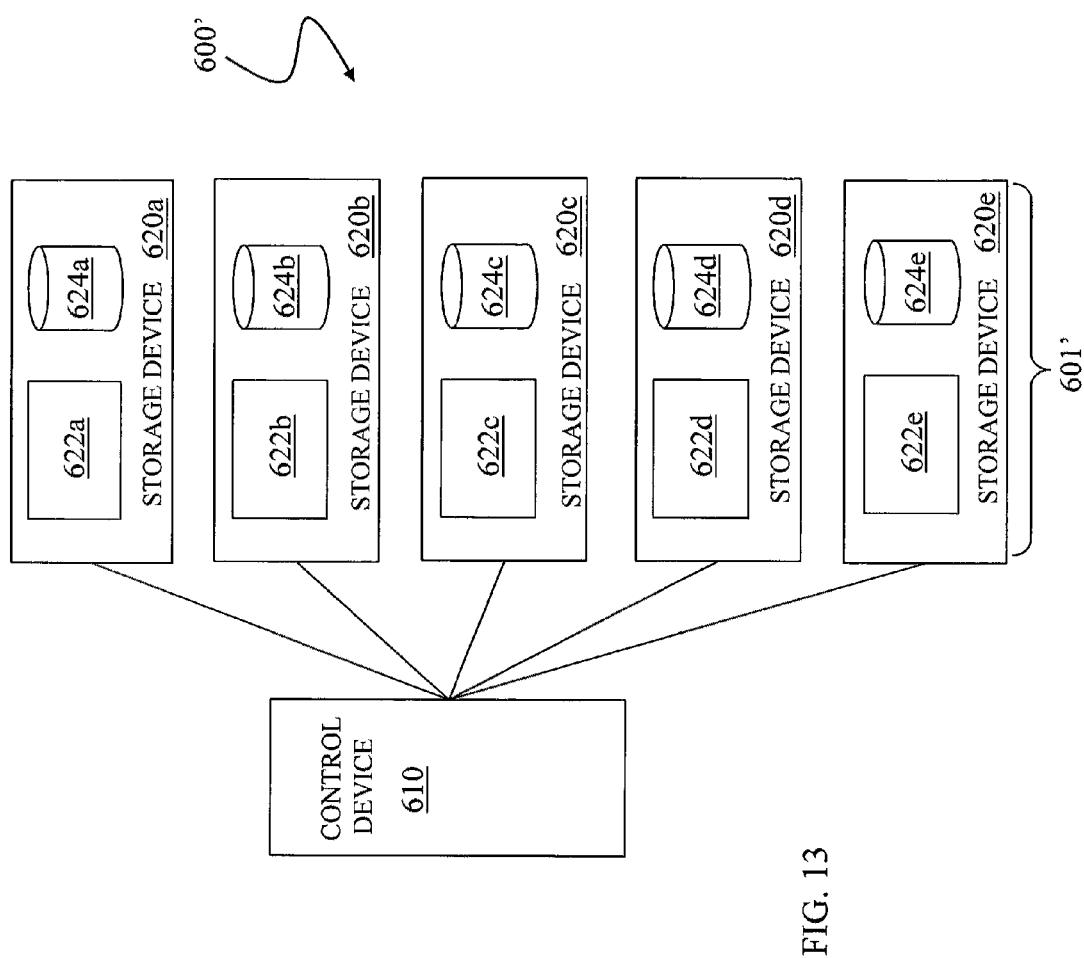
FIG. 13 a schematic illustration showing a storage system, like the storage system shown in FIG. 12, but to which two additional storage devices have been added to form an enlarged storage pool according to an embodiment of the system described herein.

FIG. 13 a schematic illustration showing a storage system 600', like the storage system 600 shown in FIG. 12, but to which two additional storage devices have been added to form an enlarged storage pool 601'. Specifically, as shown, storage devices 620d and 620e, each including at least one director 622d, 622e and at least one storage volume 624d, 624e, have been added to the storage pool 601'.

Figure 14:
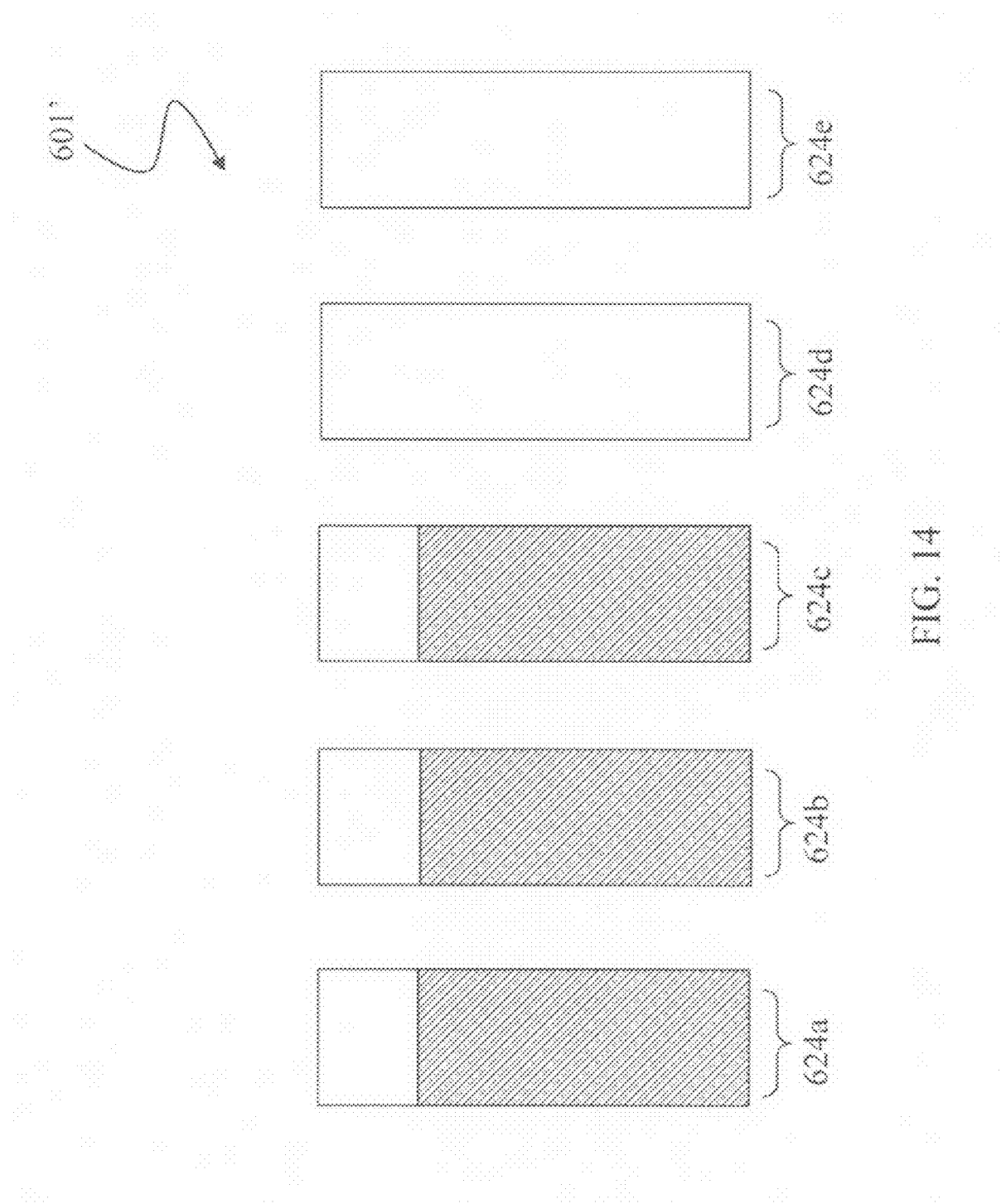
FIG. 14 is a schematic illustration showing utilization of the members of the storage pool immediately following the addition of the new pool members according to an embodiment of the system described herein.

FIG. 14 is a schematic illustration showing utilization of the members 624a-e of the storage pool 601' immediately following the addition of the new pool members 624d,e according to an embodiment of the system described herein. As illustrated, the older members 624a-c of the storage pool 601' may have a certain storage utilization level and the data stored on the members 624a-c may include data that has been striped across the members 624a-c as further discussed elsewhere herein. The new members 624d,e that have been added may be largely empty volumes. Without applying the system described herein, the growth of the storage pool 601' as illustrated may produce an unbalanced distribution of new data written to the pool 601'. Specifically, the unbalanced distribution may result from data continuing to be evenly striped across the pool even after the addition of the new empty volumes. As the older members 624a-c of the pool 601' begin to approach 100% utilization, new write data may become restricted to the new less-utilized members 624d,e.

Accordingly, the system described herein provides a method, and corresponding device(s), of normalizing capacity utilization within virtual storage pools by collecting utilization statistics across individual storage devices that are members of a virtualized storage pool. Using the pool utilization level statistics, each pool member may be assigned a score and, according to that score, may be marked as a source, target or neutral device. Based on the scores of each pool member, data may be migrated from source members to target members. The process may be iterative such that the statistics and scores may be used only to perform a fraction of the data movement that would be needed to normalize the devices and before the scores are then recalculated. In this way, the system may dynamically adapt to changing conditions within the pool such as device additions, removals and inefficient striping of new data.

Figure 15:
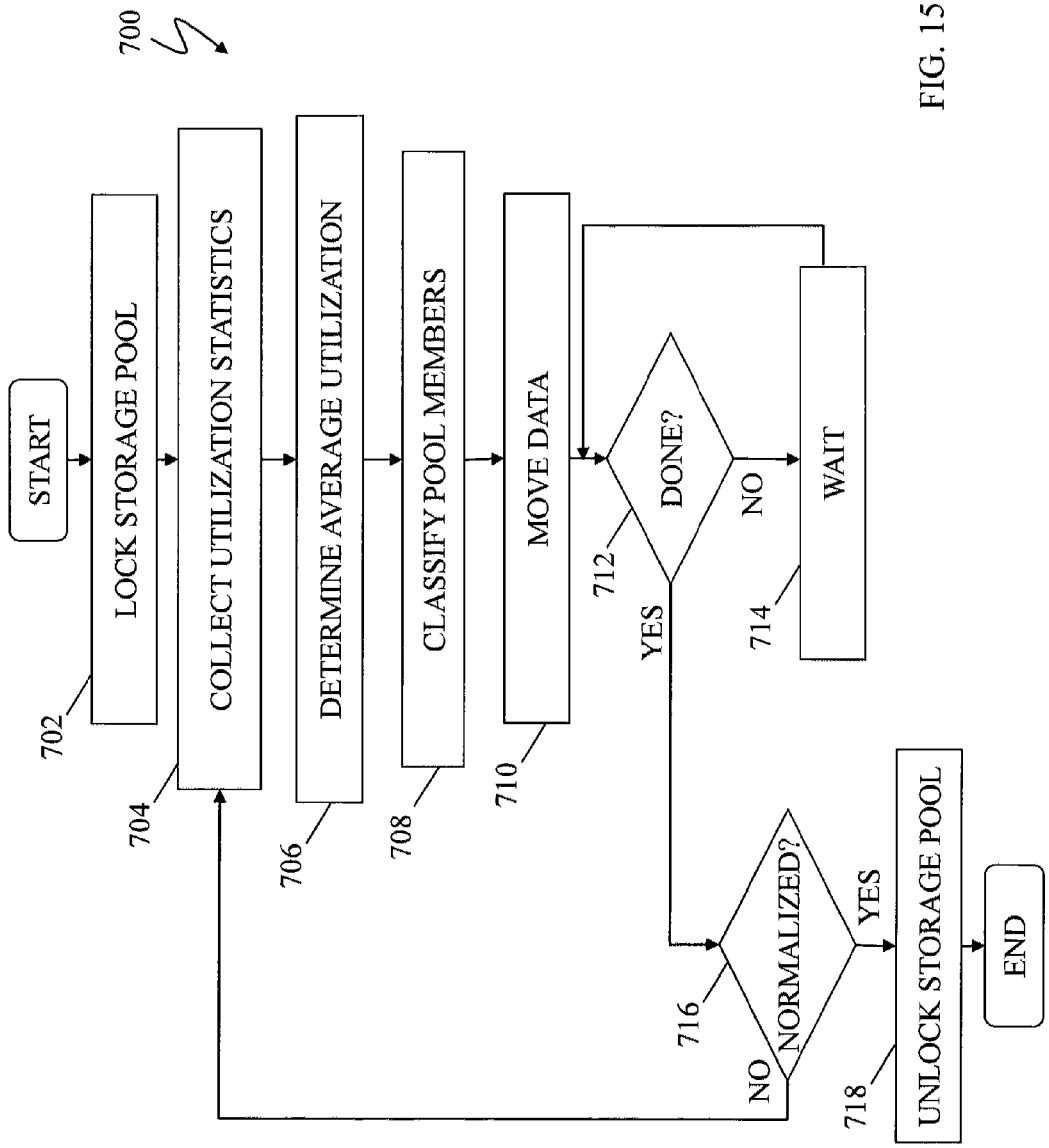
FIG. 15 is a flow diagram showing a method for rebalancing storage pool utilization according to an embodiment of the system described herein.

FIG. 15 is a flow diagram 700 showing a method for rebalancing storage pool utilization according to an embodiment of the system described herein. At a step 702, a storage pool is locked, for example locked to access to other rebalancing processes, and/or otherwise initialized for a current rebalancing process. After the step 702, processing proceeds to a step 704 where the storage pool is scanned and utilization statistics are collected for the members of the storage pool. After the step 704, processing proceeds to a step 706 where an average utilization level of the storage pool is determined. After the step 706, processing proceeds to a step 708 where pool members are classified. For example, pool members may be classified as source, target or neutral members of the storage pool. As further discussed herein, members of the storage pool may be classified based on a metric and/or other score corresponding to the utilization level of the member with respect to the average utilization level of the storage pool. In other embodiments, pool members may also be classified as excluded and/or according to other designations, as further discussed elsewhere herein.

A source member may have a utilization level that is above the average utilization level of the storage pool. In various embodiments, the amount of utilization level above the average utilization level that may determine a source member may be based on a threshold range above the utilization level. For example, the threshold range may be a percentage of utilization above the average utilization level, such as 3%, 5% or other appropriate percentage, and/or a specific memory amount, such as 100 Mb, 1 Gb or other appropriate amount, and/or other threshold range or level that may be appropriately determined based on desired operational characteristics. The threshold range may identify an acceptable tolerance for variation of members' utilization from the average utilization level of the storage pool. Accordingly, a member having a utilization level that exceeds the average utilization level and is outside the tolerance range may be designated a source member from which data may be suitably transferred in connection with the system described herein.

A target member may have a utilization level that is below the average utilization level of the storage pool. A member that has a utilization below the average utilization level and outside of the tolerance range (e.g., a percentage and/or fixed memory amount as discussed elsewhere herein) may be designated a target member to which data may be suitably transferred in connection with the system described herein.

A neutral member may have a utilization level that is within the tolerance range with respect to the average utilization level of the storage pool.

It should be noted that, in various embodiments, members of a storage pool may be excluded from the pool utilization statistics. For example, a pool member in an inactive state may be excluded from use in determining average pool utilization statistics. The excluded pool member may, however, potentially be used in the data movement steps discussed herein, for example, considered as a source member.

After the step 708, processing proceeds to a step 710 where data is moved based on the results of determining the source, target and neutral members of the storage pool. Specifically, data may be moved from source members to target members. Other embodiments are discussed elsewhere herein to address various situations concerning the member designations, for example, cases where there are no source members and/or no target members. Selection of what data to be moved may be performed according to an algorithm. In an embodiment, the data selection algorithm may be based on a randomized selection of data. By choosing data at random from a source device, to be moved to a target device, the system ensures that the devices bound to the storage pool will maintain a wide striping across all pool members. Other data selection mechanisms are possible, such as a first-in-first-out (FIFO) or last-in-first-out (LIFO) selection criteria, but may not offer all of the above-noted advantages of a random selection process.

Additionally, more complex selection algorithms may be used according to operational criteria. For example, in connection with a random selection process, certain data may be excluded from the selection and movement process. In an embodiment, data that is the subject of pending writes may be excluded and/or data that is being protected (e.g., snap copy and/or clone protected tracks) may be excluded. Furthermore, volumes and/or devices may also be excluded from the normalization determination and the data movement for various reasons. For example, devices that are currently undergoing other background tasks, such as deallocation of the device, unbinding the device from the storage pool and/or a rebalancing transfer still occurring from a previous iteration, of the system, as further discussed elsewhere herein, may not be available for use in the current rebalancing process. Other appropriate selection algorithms may used in connection with the system described herein including combinations of any of the above-noted algorithms.

After the step 710, processing proceeds to a test step 712 where it is determined whether the data movement is done. If the data movement is not done then processing proceeds to a step 714 that is a waiting step for the system to wait a specified amount of time to allow data transfers to complete. It should be noted, however, that the system described herein may operate iteratively. That is, movement of the data at the step 710 may not necessarily be sufficient to normalize the entire system performed in one iteration. The system may determine the total number of data movements that are required to normalize the system but schedule only a fraction of the total movements to be performed in a single iteration at the step 710. Accordingly, the amount of time of waiting at the waiting step may be determined based on the scheduled fraction of total data movements to be completed. It is, of course, possible for the system to schedule all required data movements to normalize the storage pool in one iteration if desired. After the step 714, processing may proceed back to test step 712 to again determine whether the scheduled data movements are done.

If the data movements are determined to be done at the test step 712, then processing proceeds to a test step 716 where it is determined whether the storage pool is normalized. In an embodiment, a storage pool may be normalized if all members of the storage pool are neutral members. However, determining normalization of the storage pool may depend on pool conditions. For example, if the average utilization is 50% and a source member is 75% utilized and a target member is 40% utilized, then 10% of the source member may be moved and the target would become neutral in the next iteration, while the source would remain a source with 65% utilization. In other embodiments, different selection and movement processes may be performed in cases where there are source members but no target members and/or target members but no source members. In such cases, algorithms may be used to move smaller amounts of data from or to neutral members (i.e., from source members or to target members) than would be used for normal data movements preformed between source and target members. Accordingly, neutral members may be maintained in a neutral state within the tolerance but still have their storage allocations adjusted. If the storage pool is determined not to be normalized at the test step 716, then processing proceeds back to the step 704 to perform another rebalancing iteration. If at the test step 716, it is determined that the storage pool is normalized, then processing proceeds to a step 718 where the storage pool is unlocked and again available for other processing, such as further rebalancing tasks. After the step 718 processing is complete. In various embodiments, the processing shown in the flow diagram 700 may be performed when initiated by a user and/or automatically on a real-time basis after a specified time period (e.g., every five hours).

FIG. 16A is a schematic illustration of the capacity utilizations of the volumes 624*a-e* shown in FIG. 14 immediately following the addition of the new empty volumes 624*d,e* to the storage pool 601' and further showing an average utilization level 650 of the volumes 624*a-e* after collecting utilization statistics and determining the average utilization according to the processing described elsewhere herein. A tolerance 652 according to a threshold range around the average utilization level 650 is shown. As illustrated, based on the average utilization level 650 and the tolerance 652, the volumes 624*a-c* may be determined as source volumes since their utilizations exceed the average level utilization level 650 above the tolerance 652 and the volumes 624*d,e* determined as target volumes since their utilizations fall below the average utilization level 650 beneath the tolerance 652.

FIG. 16B is a schematic representation of storage allocation for data stored on the volumes 624*a-e* immediately following the addition of the new empty volumes 624*d,e* to the storage pool 601'. Data blocks are illustrated by differently patterned blocks and indicate that the data has been striped across the volumes 624*a-c*. As discussed above, without applying the system described herein, as more data is written to the volumes 624*a-e*, the old volumes 624*a-c* would reach 100% utilization and further data writes would be restricted to new volumes 624*d,e* and would not be appropriately striped across the volumes of the storage pool.

FIG. 17A is a schematic representation of capacity utilization of the volumes 624*a-e* after rebalancing processing is performed according to the system described herein, and FIG. 17B is a schematic representation of resulting storage allocation for data stored on the volumes 624*a-e* in the storage pool 601'. Referring to FIG. 17B, in accordance with the rebalancing processing further discussed elsewhere herein, data has been randomly selected from volumes 624*a-c* (as source volumes) and moved to volumes 624*d,e* (as target volumes) according to a random selection algorithm. FIG. 17A illustrates the capacity utilization of the volumes 624*a-e* following the random data selection and movement of rebalancing processing according to the system described herein and shows that the volumes 624*a-e* have utilization levels within the tolerance 652 of the average utilization level 650 and are now neutral volumes. Accordingly, the storage pool 601' shown in FIGS. 17A and 17B has been normalized according to the system described herein.

FIGS. 18A-C are graphs that schematically show normalizing effects of rebalancing operations on storage pools according to the system described herein. In each of the figures, the graph shows utilization statistics of a storage pool over time, including average utilization level of the source pool, the tolerance around the average utilization level, and the utilization levels of a source member having maximum utilization and a target member having minimum utilization.

FIG. 18A shows a simple case where the average utilization level of a storage pool remains constant while rebalancing processing according to the system described herein is performed. As illustrated, over time the utilization of the maximum source member is decreased and the utilization of the minimum target member is increased in connection with data selection and movement according to the rebalancing processing until the maximum source member utilization and the minimum target member utilization converges within the tolerance range of the average utilization level. It is noted that although the graphs of the source member and target member utilizations are shown as continuous for purposes of schematic illustration, the system may actually provide for discrete increases and decreases in the utilizations in accordance with the operation, wait times, processing times, etc. of the system described herein.

FIG. 18B schematically shows a scenario where the storage pool undergoes natural pool growth during rebalancing. As illustrated, over the time of the rebalancing, the average utilization level of the storage pool may increase. Accordingly, the system described herein is able to dynamically adjust to changing pool conditions via multiple iterations of the rebalancing process. The system described herein enables the members of the source pool to be normalized within the tolerance range of the average utilization level even as the average utilization level is increasing (or decreasing).

FIG. 18C schematically shows a scenario where new target members are added to the storage pool during the rebalancing process. As a result of the new target members, the average utilization undergoes a discrete reduction consistent with the increase in target member utilization availability. Using rebalancing process iterations, the system described herein may dynamically adapt to the additional target members of the storage pool in order to provide a normalized system at the end of the rebalancing process.

The rebalancing processing of the system described herein may also be used to handle inefficient allocations that may occur within a storage pool. For example, in a case where a single device receives a larger amount of allocations than its peers, the device may be normalized to achieve even growth with the other members of the storage pool. Further, the system may also scale on a larger level in the case where the rate of allocations increases along with the number of pool members. Other normalization scenarios of static and/or dynamically-changing storage pools may be addressed by the system described herein.

The system described herein may be appropriately modified and configured according to desired operating conditions. As further discussed elsewhere herein, source and target device selection and number of groups moved may be scaled based on the pool conditions. Furthermore, in accordance with the discussion herein, performing rebalancing processing on a storage pool may have an effect on I/O operations with the storage pool. Accordingly, there may be a balance between scheduling rebalancing processes and performing I/O using members of the storage pool. In various embodiments, controls may be used to throttle the system described herein, including controlling times of rebalancing iterations and adjusting the number of movements performed in a set time period and the number of devices of a storage pool on which the system will actively move data. For example, the system may be controlled to move data at or below a certain rate (e.g., 100 Gb/hour). Such controls may be provided via a user-configurable software interface and/or incorporated into conditional operating characteristics of the system, and which may be configured, for example, in connection with the control device 610 that is further discussed elsewhere herein. The control device 610 may also provide functionality for aborting the rebalancing processing in response to a user command and/or in accordance with error processing.

The system described herein may be used in connection with automated testing of storage pool devices. Automating testing allows rebalancing to be tested during free runs. The user may specify an over subscription ratio when configuring the storage pool that will leave a certain amount of total pool capacity deactivated at the beginning of the test run. As the pool grows, capacity may be activated and rebalancing initiated. Iterations through the test may drain data from and reactivate a random number of devices, but not more than the over subscription ratio, and cause rebalancing after the devices are activated. Pool members may be cycled through as drain targets, to touch all devices, not just the inactive devices from the beginning of the test.

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of storage management in a storage pool having a plurality of pool members, comprising:
   collecting utilization statistics of the storage pool;
   determining an average utilization level of the storage pool;
   classifying at least some of the plurality of pool members according to the average utilization level, wherein the classified pool members of the plurality of pool members are classified as one of: source members, target members and neutral members;
   selecting stored data from among the classified pool members;
   scheduling at least a portion of the selected data to be moved from at least a first one of the classified pool members to at least a second one of the classified pool members; and
   moving the scheduled portion of the selected data from the first one of the classified pool members to the second one of the classified pool members, wherein the neutral members have a utilization level that is within a tolerance range of the average utilization level, wherein the source members have a utilization level that exceeds the average utilization level and outside the tolerance range, and wherein the target members have a utilization level that is below the average utilization level and outside the tolerance range.

2. The method according to claim 1, wherein the first one of the classified pool members is a source member and the second one of the classified pool members is a target member.

3. The method according to claim 1, wherein selecting data from among the classified pool members includes selecting the data according to a random selection algorithm.

4. The method according to claim 1, further comprising:
   determining whether the storage pool is normalized.

5. A method of storage management in a storage pool having a plurality of pool members, comprising:
   collecting utilization statistics of the storage pool;
   determining an average utilization level of the storage pool;
   classifying at least some of the plurality of pool members according to the average utilization level, wherein the classified pool members of the plurality of pool members are classified as one of: source members, target members and neutral members;
   selecting stored data from among the classified pool members;
   scheduling at least a portion of the selected data to be moved from at least a first one of the classified pool members to at least a second one of the classified pool members;
   moving the scheduled portion of the selected data from the first one of the classified pool members to the second one of the classified pool members; and
   determining whether the storage pool is normalized, wherein the storage pool is normalized if all of the classified pool members are neutral members each having a utilization level that is within a tolerance range of the average utilization level of the storage pool.

6. A method of storage management in a storage pool having a plurality of pool members, comprising:
   collecting utilization statistics of the storage pool;
   determining an average utilization level of the storage pool;
   classifying at least some of the plurality of pool members according to the average utilization level, wherein the classified pool members of the plurality of pool members are classified as one of: source members, target members and neutral members;
   selecting stored data from among the classified pool members;
   scheduling at least a portion of the selected data to be moved from at least a first one of the classified pool members to at least a second one of the classified pool members;
   moving the scheduled portion of the selected data from the first one of the classified pool members to the second one of the classified pool members;
   determining whether the storage pool is normalized; and
   performing the method iteratively, wherein only a fraction of data sufficient to normalize the storage pool is selected and moved from the first one of the classified pool members to the second one of the classified pool members before performing another iteration.

7. A computer readable storage medium storing computer software that manages storage in a storage pool having a plurality of pool members, the computer software comprising:
   executable code that collects utilization statistics of the storage pool;
   executable code that determines an average utilization level of the storage pool;
   executable code that classifies at least some of the plurality of pool members according to the average utilization level, wherein the classified pool members of the plurality of pool members are classified as one of: source members, target members and neutral members;
   executable code that selects stored data from among the classified pool members;
   executable code that schedules at least a portion of the selected data to be moved from at least a first one of the classified pool members to at least a second one of the classified pool members; and executable code that moves the scheduled portion of the selected data from the first one of the classified pool members to the second one of the classified pool members, wherein the neutral members have a utilization level that is within a tolerance range of the average utilization level, wherein the source members have a utilization level that exceeds the average utilization level outside the tolerance range, and wherein the target members have a utilization level that is below the average utilization level outside the tolerance range.

8. The computer readable storage medium according to claim 7, wherein the first one of the classified pool members is a source member and the second one of the classified pool members is a target member.

9. The computer readable storage medium according to claim 7, wherein the executable code that selects data from among the classified pool members includes executable code that selects the data according to a random selection algorithm.

10. The computer readable storage medium according to claim 7, further comprising:
executable code that determines whether the storage pool is normalized.

11. A computer readable storage medium storing computer software that manages storage in a storage pool having a plurality of pool members, the computer software comprising:
executable code that collects utilization statistics of the storage pool;
executable code that determines an average utilization level of the storage pool;
executable code that classifies at least some of the plurality of pool members according to the average utilization level, wherein the classified pool members of the plurality of pool members are classified as one of: source members, target members and neutral members;
executable code that selects stored data from among the classified pool members;
executable code that schedules at least a portion of the selected data to be moved from at least a first one of the classified pool members to at least a second one of the classified pool members; and
executable code that moves the scheduled portion of the selected data from the first one of the classified pool members to the second one of the classified pool members; and
executable code that determines whether the storage pool is normalized, wherein the storage pool is normalized if all of the classified pool members are neutral members each having a utilization level that is within a tolerance range of the average utilization level of the storage pool.

12. A computer readable storage medium storing computer software that manages storage in a storage pool having a plurality of pool members, the computer software comprising:
executable code that collects utilization statistics of the storage pool;
executable code that determines an average utilization level of the storage pool;
executable code that classifies at least some of the plurality of pool members according to the average utilization level, wherein the classified pool members of the plurality of pool members are classified as one of: source members, target members and neutral members;
executable code that selects stored data from among the classified pool members;
executable code that schedules at least a portion of the selected data to be moved from at least a first one of the classified pool members to at least a second one of the classified pool members; and
executable code that moves the scheduled portion of the selected data from the first one of the classified pool members to the second one of the classified pool members;
executable code that determines whether the storage pool is normalized; and
executable code that controls iterations of storage management processing of the storage pool, wherein only a fraction of data sufficient to normalize the storage pool is selected and moved from the first one of the classified pool members to the second one of the classified pool members before performing another iteration.

13. A storage system, comprising:
a plurality of interconnected directors, wherein at least some of the directors handle reading and writing data for at least one storage device;
a plurality of storage volumes, coupled to at least some of the directors, that store data for the at least one storage device;
a computer readable storage medium, provided in at least one of the directors, storing computer software for managing data within manages storage in a storage pool having a plurality of pool members, the computer software comprising:
executable code that collects utilization statistics of the storage pool;
executable code that determines an average utilization level of the storage pool;
executable code that classifies at least some of the plurality of pool members according to the average utilization level, wherein the classified pool members of the plurality of pool members are classified as one of: source members, target members and neutral members;
executable code that selects stored data from among the classified pool members;
executable code that schedules at least a portion of the selected data to be moved from at least a first one of the classified pool members to at least a second one of the classified pool members; and
executable code that moves the scheduled portion of the selected data from the first one of the classified pool members to the second one of the classified pool members, wherein the neutral members have a utilization level that is within a tolerance range of the average utilization level, wherein the source members have a utilization level that exceeds the average utilization level outside the tolerance range, and wherein the target members have a utilization level that is below the average utilization level outside the tolerance range.

14. The storage system according to claim 13, wherein the computer readable storage medium is provided in a director of a control device that is coupled to the plurality of storage volumes.

15. The storage system according to claim 13, wherein the executable code that selects data from among the classified pool members includes executable code that selects the data according to a random selection algorithm.

16. The storage system according to claim 13, further comprising:

executable code that determines whether the storage pool is normalized.

17. A storage system, comprising:

a plurality of interconnected directors, wherein at least some of the directors handle reading and writing data for at least one storage device;

a plurality of storage volumes, coupled to at least some of the directors, that store data for the at least one storage device;

a computer readable storage medium, provided in at least one of the directors, storing computer software for managing data within manages storage in a storage pool having a plurality of pool members, the computer software comprising:

executable code that collects utilization statistics of the storage pool;

executable code that determines an average utilization level of the storage pool;

executable code that classifies at least some of the plurality of pool members according to the average utilization level, wherein the classified pool members of the plurality of pool members are classified as one of: source members, target members and neutral members;

executable code that selects stored data from among the classified pool members;

executable code that schedules at least a portion of the selected data to be moved from at least a first one of the classified pool members to at least a second one of the classified pool members;

executable code that moves the scheduled portion of the selected data from the first one of the classified pool members to the second one of the classified pool members;

executable code that determines whether the storage pool is normalized; and executable code that controls iterations of storage management processing of the storage pool, wherein only a fraction of data sufficient to normalize the storage pool is selected and moved from the first one of the classified pool members to the second one of the classified pool members before performing another iteration.

* * * * *